United States Patent
Phillip et al.

(10) Patent No.: US 10,022,679 B2
(45) Date of Patent: Jul. 17, 2018

(54) MULTIBLOCK COPOLYMERS AND METHODS OF USE

(71) Applicants: University of Notre Dame du Lac, Notre Dame, IN (US); Purdue Research Foundation (PRF), West Lafayette, IN (US)

(72) Inventors: William A. Phillip, Granger, IN (US); Bryan W. Boudouris, Lafayette, IN (US)

(73) Assignees: University of Notre Dame du Lac, Notre Dame, IN (US); Purdue Research Foundation, West Lafayette, IN (US)

( * ) Notice: Subject to any disclaimer, the term of this patent is extended or adjusted under 35 U.S.C. 154(b) by 179 days.

(21) Appl. No.: 14/774,936

(22) PCT Filed: Mar. 11, 2014

(86) PCT No.: PCT/US2014/023497
§ 371 (c)(1),
(2) Date: Sep. 11, 2015

(87) PCT Pub. No.: WO2014/164793
PCT Pub. Date: Oct. 9, 2014

(65) Prior Publication Data
US 2016/0023171 A1 Jan. 28, 2016

Related U.S. Application Data

(60) Provisional application No. 61/851,615, filed on Mar. 11, 2013, provisional application No. 61/874,776, filed on Sep. 6, 2013.

(51) Int. Cl.
*B01D 71/80* (2006.01)
*B01D 67/00* (2006.01)
(Continued)

(52) U.S. Cl.
CPC ............ *B01D 71/80* (2013.01); *B01D 61/02* (2013.01); *B01D 67/0011* (2013.01);
(Continued)

(58) Field of Classification Search
None
See application file for complete search history.

(56) References Cited

U.S. PATENT DOCUMENTS 4,828,705 A * 5/1989 Thakore ................. A61K 9/284
 210/356
5,098,570 A * 3/1992 Schucker ............... B01D 71/54
 210/500.37

(Continued)

FOREIGN PATENT DOCUMENTS

CA 2660956 A1 3/2008
CN 1829564 A 9/2006
(Continued)

OTHER PUBLICATIONS

Duong, P.H.H., et al., "Planar Biomimetic Aquaporin-incorporated Triblock Copolymer Membranes on Porous Alumina Supports for Nanofiltration," J. Membrane Sci.; 409-410:34-43; Aug. 1, 2012.
(Continued)

*Primary Examiner* — Krishnan S Menon
(74) *Attorney, Agent, or Firm* — Haukaas Fortius PLLC; Michael H. Haukaas

(57) ABSTRACT

The present invention relates to polymer compositions and their manufacture. Specifically, the invention relates to multiblock polymers and copolymers, their fabrication, modification and/or functionalization and use as membranes or films.

18 Claims, 13 Drawing Sheets

(51) Int. Cl.
*B01D 71/28* (2006.01)
*B01D 71/40* (2006.01)
*B01D 61/02* (2006.01)
*B01D 69/02* (2006.01)
*C02F 1/44* (2006.01)
*C08F 293/00* (2006.01)
*C08J 9/00* (2006.01)

(52) U.S. Cl.
CPC ......... *B01D 67/0093* (2013.01); *B01D 69/02* (2013.01); *C02F 1/44* (2013.01); *C08F 293/005* (2013.01); *C08J 9/00* (2013.01); B01D 67/0016 (2013.01); B01D 71/28 (2013.01); B01D 71/40 (2013.01); B01D 2325/02 (2013.01); B01D 2325/021 (2013.01); B01D 2325/04 (2013.01); C08J 2353/02 (2013.01)

(56) References Cited

U.S. PATENT DOCUMENTS

| 6,458,310 | B1 | 10/2002 | Liu | |
|---|---|---|---|---|
| 9,527,041 | B2* | 12/2016 | Wiesner | .............. C08J 5/18 |
| 2006/0118482 | A1 | 6/2006 | Kloos et al. | |
| 2009/0173694 | A1* | 7/2009 | Peinemann | ........ B01D 67/0011 |
| | | | | 210/650 |
| 2012/0025414 | A1* | 2/2012 | Schmidt | ................ B82Y 40/00 |
| | | | | 264/212 |

FOREIGN PATENT DOCUMENTS

| CN | 101516481 A | 8/2009 |
|---|---|---|
| CN | 102203159 A | 9/2011 |
| JP | S5676408 A | 6/1981 |
| JP | S62193604 A | 8/1987 |
| JP | 2000033246 A | 2/2000 |
| JP | 2008189910 A | 8/2008 |
| JP | 2009533217 A | 9/2009 |
| JP | 2008272636 A | 11/2009 |
| JP | 2009256592 A | 11/2009 |
| JP | 2012506772 A | 3/2012 |
| RU | 2166984 C2 | 5/2001 |
| RU | 2211725 C2 | 9/2003 |
| RU | 2372983 C2 | 9/2009 |
| RU | 2009115200 A | 10/2010 |
| WO | 2004035180 A1 | 4/2004 |
| WO | 2012151482 A2 | 11/2012 |

OTHER PUBLICATIONS

Extended European Search Report issued by the European Patent Office for EP2969155A2 dated Oct. 14, 2016.
Jung, A., et al., "Formation of integral Asymmetric Membranes of AB Diblock and ABC Triblock Copolymers by Phase Inversion," Macromol Rapid Commun.; 34(7):610-615; Apr. 12, 2013.
Mastroianni, S.E., et al., "Interfacial Manipulations: Controlling Nanoscale Assembly in Bulk, Thin Film, and Solution Block Copolymer Systems," Langmuir.; 29(12):3864-3878; Mar. 26, 2013.
Savage, D.F., et al., "Architecture and Selectivity in Aguaporins: 2.5 Å X-Ray Structure of Aquaporin Z," PLoS Biol.; 1(3):334-340; Dec. 2003.
Stoenescu, R., et al., "Asymmetric ABC-triblock Copolymer Membranes Induce a Directed Insertion of Membrane Proteins," Macromol Biosci.; 4(10):930-935; Oct. 20, 2004.
Dorin, Rachel Mika et al., "Designing Block Copolymer Architectures for Targeted Membrane Performance," polymer 55 (2014) 347-353.
Guo, Fengxiao, "Functional Nanoporous Polymers From Block Copolymer Precursors," Ph.D. Thesis, Jun. 23, 2010 [online], Department of Chemical and Biochemical Engineering, Technical University of Denmark.
Phillip, William A., et al., "Tuning Structure and Properties of Graded Triblock Terpolymer-Based Mesoporous and Hybrid Films," ACS Publications, Nano Letters, 2011, 11, 2892-2900.
Sperschneider, Alexandra et al., "Towards Nanoporous Membranes Based on ABC Triblock Terpolymers," Small 2007, 3, No. t, 1056-1063.

* cited by examiner

MULTIBLOCK COPOLYMERS AND METHODS OF USE

RELATED APPLICATIONS

This application is a National Stage filing under 35 U.S.C. § 371 of International Application No. PCT/US2014/023497, filed Mar. 11, 2014, which claims priority under 35 U.S.C. § 119(e) to U.S. Provisional Patent Application No. 61/851,615, filed Mar. 11, 2013, and U.S. Provisional Patent Application No. 61/874,776, filed Sep. 6, 2013, which applications are incorporated herein by reference in their entirety.

GOVERNMENT SUPPORT

This invention was made with government support under DHHS RR025761 awarded the National Institutes of Health. The government has certain rights in the invention.

FIELD OF THE INVENTION

The present invention relates to polymer compositions and their manufacture. Specifically, the invention relates to multiblock polymers and copolymers, their fabrication, modification and/or functionalization and use as membranes or films.

BACKGROUND

Chemical separations are energy-intensive. About ten percent of the daily energy use by humans is consumed to operate these processes. Despite their large energy demand, chemical separations are essential to the production of food, the purification of drinking water, and the development of therapeutics. As such, a need exists to create energy-efficient and environmentally-responsible sustainable materials and separation processes to produce vital resources that are important to sustaining human life on earth.

Because they do not rely on heat to create a separation, membrane separations avoid the thermodynamic restrictions associated with heat use (i.e., the Carnot efficiency). For example, the success of seawater desalination by reverse osmosis (RO) is a model for the energy savings and sustainability that can be realized by replacing traditional separation processes with membrane separations. At its inception, RO desalination consumed almost three times more energy than equivalent thermal desalination methods, such as multistage flash distillation (MSF). However, over the past forty years, due to fundamental technological advances, the energy demand of seawater RO has fallen dramatically, and it now requires half the energy of MSF. Due to this energy savings, RO is rapidly displacing thermal methods as the preferred desalination technology.

Central to the success of RO desalination was the optimization of the membrane material and membrane structure. Specifically, the transition from asymmetric cellulose acetate membranes to thin-film composite membranes based on polyamide chemistries fueled the success of reverse osmosis. Similar opportunities exist for membrane separations to replace other energy inefficient and environmentally taxing separations processes, such as chromatography and extraction.

Therefore, it is clear that membrane separations have garnered increased attention in recent years because of their ability to bypass the limitations associated with heat use, which is an inherent inefficiency that hinders more traditional, thermally-driven separations. Membranes also are finding application in the purification of thermally-sensitive molecules. At the same time, the purification of dilute solutes is becoming increasingly important to industry. For example, the separation of monoclonal antibodies and other biopharmaceuticals from fermentation broths as well as the isolation of chemicals derived from naturally-occurring resources are emerging areas that rely on robust separation schemes. However, using traditional separations methods to purify these dilute solutes is energy intensive and requires large volumes of solvents, which tax the natural environment and inherently increase the cost of production. As such, the development of membrane processes that can accomplish these separations in a more environmentally-responsible manner while using less energy is an active area of research. Currently, membranes that would allow chromatography or extraction based separation processes to be replaced by membrane separations do not exist.

As such, generating architectures that have monodisperse pore sizes and can attain high fluxes, while adding the ability to tailor pore wall chemistry in order to increase fouling resistance or to perform chemically-selective separations would advance the state-of-the-art in current membrane technologies.

SUMMARY OF THE INVENTION

The present invention provides a novel method for the development and manufacture of new materials, processes, and devices for the implementation of membrane separations, which have been a proven pathway toward more sustainable chemical separations.

To this end, the invention described herein embraces a new paradigm in separations technology that utilizes self-assembled, chemically-tunable multiblock copolymers to fabricate, in a facile and scalable manner, a novel membrane platform that contains well-defined monodisperse pores with tunable pore chemistries.

In one embodiment, the invention described herein embraces functional multiblock copolymers useful in the fabrication of nanostructured, high performance membranes with functional pore walls.

One aspect of the invention provides a multiblock copolymer membrane comprising a nanoporous active selective layer containing pores having an average diameter of less than 5 nm.

The exquisite control of the physical and chemical properties that can be achieved when practicing aspects of the invention improve the properties of the membrane. The precise control of pore size and shape allow for a much higher flow rate compared to current commercial membranes. This also allows for a size-exclusion based mechanism where ions, molecules, or other matter in an aqueous or gaseous medium can be preferentially allowed passage through the membrane based on having an effective size that is smaller than the membrane pores or can be preferentially disallowed passage through the membrane based on having an effective size that is larger than the membrane pores. The effective size of the ion or molecule may be in reference to its ionic size or to its hydration size. When an ion is dissolved in water it forms a hydration shell of loosely attached water molecules that tends to increase its effective size (this is known as the hydration size) in terms of its transport properties. The chemical functionalization of the membrane and/or pores can also be used to further enhance membrane selectivity.

In some embodiments the membrane is chemically-functionalized to enhance affinity to a specific type of target matter or contaminant or in other embodiments it may be designed to mitigate fouling propensity of the membrane. The selectivity of the membrane may be due solely to the pore sizes or to the pore chemistry, or in many embodiments to a combination of the physical and chemical characteristics of the membrane.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

I. Introduction

Figure 1:
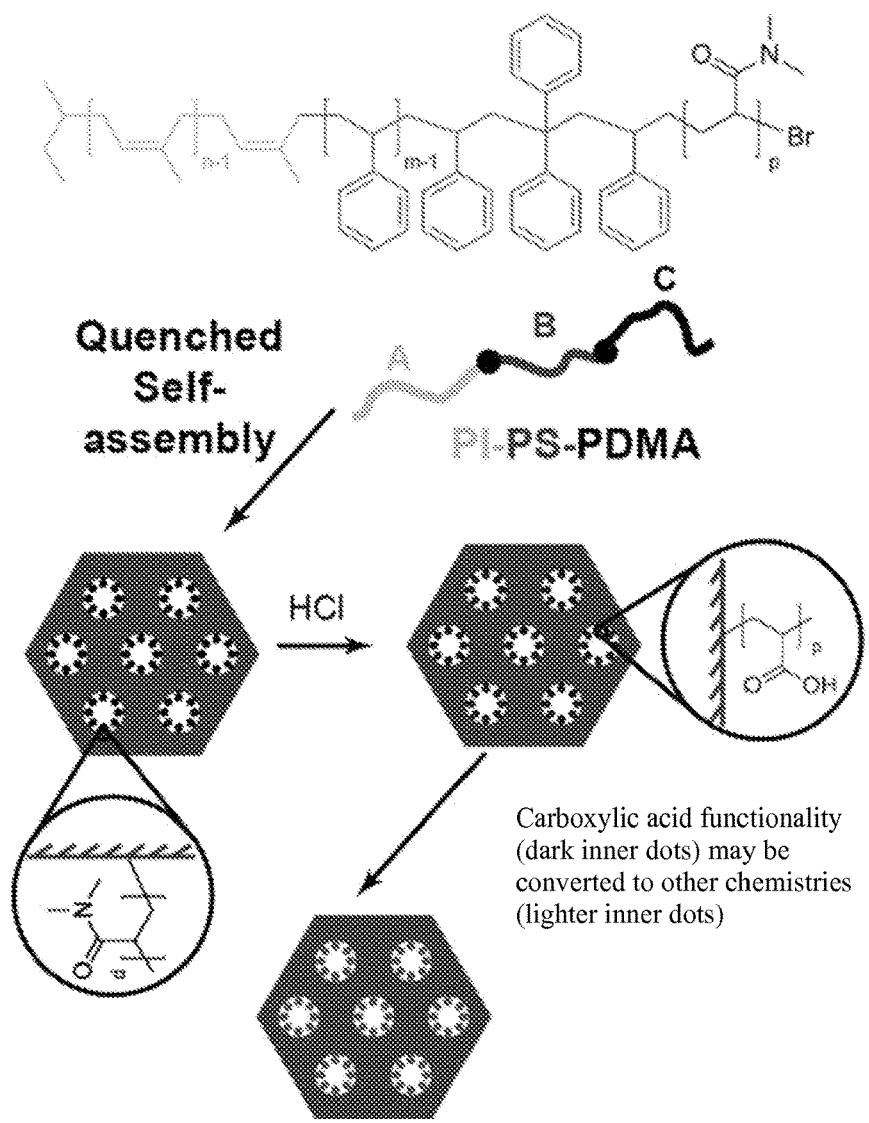
FIG. 1. After self-assembly of the block terpolymer to create the nanoporous template and proper structural characterization, the PtBMA or PDMA (shown in the figure as Block C) can be hydrolyzed to leave a carboxylic acid functionality on the pore walls. This functionality can be manipulated to a number of other chemistries to aid in separation.

This invention allows the manufacture of novel membranes with physical and chemical properties that were previously unachievable. Previous work with block copolymers has shown the self-assembly patterns that can be obtained by controlling the process parameters can be particularly useful in the design of membranes by enabling the formatting of a nanoscale porous pattern of vertically-oriented, closely-packed cylindrical structures embedded within a membrane material. However, prior work has not been able to achieve the small pore sizes that would be necessary for the use of these membranes as, for example, reverse osmosis membranes.

By using multiblock copolymers, this present inventors have, for the first time, been able to obtain membranes from self-assembled pores with sizes that are small enough to allow for selective exclusion of ions dissolved in an aqueous solution based on their size. Data provided herein demonstrate sub-nanometer (<1 nm) pores that are capable of rejection of even the smallest of dissolved ions and are in the rage of pore sizes needed for a reverse osmosis or forward osmosis system.

The present invention comprises membranes and/or films fabricated, cast, formed or manufactured from polymers. Such polymers may be self-assembling polymers. As used herein, a "polymer" comprises a substance that has a molecular structure consisting chiefly or entirely of a large number of similar units covalently-bonded together. The polymers of the present invention may comprise multiblock polymers. As used herein a "multiblock" polymer is one in which there are greater than two distinct polymeric blocks or regions. Multiblock polymers include, but are not limited to multiblock copolymers, multiblock tri- or terpolymers, triblock terpolymers, and higher order multiblock polymers comprising four, five, six, seven, eight, nine or ten distinct polymer regions or blocks.

As used herein, a "multiblock copolymer" is a polymer comprising two or more chemically distinct regions or segments (referred to as "blocks") preferably joined in a linear manner, that is, a polymer comprising chemically differentiated units which are joined end-to-end. Types of polymers useful in the present invention are described in more detail herein.

The membranes and/or films of the present invention may be porous, isoporous or semiporous. As used herein, the term "porous" refers to a material whose molecular structure is permeable to fluid or gas flow. A material which is "semiporous" is porous with respect to some materials and not to others. By "isoporous" it is meant that the surface layer of the membranes or films have a narrow pore size distribution. These materials are frequently characterized by the size of their pores, which are voids in the material: very small pores having diameters less than 2 nanometers (nm); intermediate size pores having diameters between 2 and 50 nm; and very large pores have diameters greater than 50 nm. Conventional porous materials have randomly distributed voids that exhibit neither shape nor size uniformity. In contrast, voids or particles possessing a periodic distribution or lattice are referred to as ordered and those having a narrow size and shape distribution are referred to as monodisperse. It is noted that pore size is typically used in relation to the average diameter of the pores. The pores may not be exactly circular in cross-section but they are typically cylindrical or tubular structures of approximately constant cross sectional area and shape.

Multiblock copolymers can have a range of dispersity values (Mw/Mn). For example, the multiblock copolymer can have a dispersity value (Đ) ranging from 1.0 to 1.5, including all values to the 0.05 and ranges there between. In some embodiments, the dispersity value is equal to or greater than 1 and less than 1.1, equal to or greater than 1 and less than 1.2, equal to or greater than 1 and less than 1.3, equal to or greater than 1 and less than 1.4, equal to or greater than 1 and less than 1.5. It is desirable that the multiblock copolymer have a Đ of 1.01 to 1.4.

Another feature of the membranes or films of the invention is their capacity for functionalization. Functionalization may be chemical or structural. Chemical functionalization of the membranes or films of the present invention may occur or be effected at the membrane surface, the interface between one or more pores and the membrane or the walls lining the inside of the pores. Chemical functionalization may be imparted prior to casting the membrane, during the casting process or after casting of the membrane or film.

II. Fabrication of Membranes

Traditionally, membranes have been fabricated using 1) phase separation techniques, which result in highly porous membranes, or 2) the high-energy bombardment of dense films to produce track-etched membranes that contain a low density of pores with a monodisperse size. However, current filtration membranes made in these ways are stymied from certain applications due to the tradeoff between high flux and high size selectivity and the deleterious effects of fouling. Furthermore, current commercial membranes that have narrowly-distributed pores do not have the ability to separate materials of similar size with different chemical functionalities.

One technique for generating membrane pores with narrow size distributions includes the incorporation of self-assembling block polymers as the casting material. This enables the microphase-separated domains of the block polymer to template pore formation. Previously, this has occurred using either non-solvent phase separation techniques to generate anisotropic membranes or the self-assembly of block polymers into ordered nanostructures and the subsequent removal of one of the phases through selective etching techniques to yield monolithic structures.

In the phase inversion methodologies, porous channels form as the lyophilic shells of micelles contract during the casting process. This leaves the volumes previously occupied by the solvent-loving moieties as open pores. Monolithic membrane pores are produced by the selective etching of specific well-ordered nanoscale domains. In both processes, the resulting membranes have highly uniform pore sizes. The use of the self-assembly and non-solvent induced phase separation (SNIPS) technique has been favored over monolithic templates recently due to its ability to make thinner membranes, which result in higher fluxes without compromising size selectivity. Another advantage to using the SNIPS technique is that in some embodiments it does not require any selective etching. Furthermore, the SNIPS process can be modified to coat thin membranes onto a mechanical support, such as a non-woven fabric, resulting in the potential for membrane fabrication on the industrial scale.

The SNIPS method is not without limitations. Previous efforts regarding block polymer membranes fabricated via the SNIPS methodology have resulted in a limited number of pore functionalities. The polystyrene-b-poly(vinyl pyridine) (PS-PVP) and polyisoprene-b-polystyrene-b-poly(4-vinyl pyridine) (PI-PS-P4VP) systems have been demonstrated to be hindered by the limited chemical group conversion of the PVP functionality, which resides on the pore wall. In addition, the PI-PS-P4VP system relies on anionically-controlled polymerization mechanisms that can require low temperatures (−78° C.), in situ solvent exchange procedures, and stringent non aura conditions with no foreign bodies for high fidelity synthesis on any scale, which limits the large-scale utility of membranes made from these materials.

As such, a need exists in the art for a methodology that enables the large-scale production of block polymers such that nanostructured membranes can be generated that allow for: 1) high selectivity, 2) high flux, 3) straightforward materials syntheses, and 4) generation of tailored pore functionalities. The present invention provides such a solution.

According to one aspect of the present invention, nanostructured films or membranes are fabricated which contain tailored pore chemistries. As used herein, a "membrane" refers to a selective barrier that allows, concomitantly with the flow of a fluid, whether gas or liquid, the passage of certain constituents while retaining other constituents. A "film" refers to a layer of material ranging from less than 10 nm to micrometers in thickness. A membrane may be a film and/or a film may act as a membrane.

The polymer membranes and/or films of the present invention comprise a nanoporous surface active layer and a microporous support layer. Unless otherwise stated, when referring to pore size, it is the pore diameter which is being referenced. Pore sizes of the surface active layer are less than 5 nm, less than 4 nm, less than 3 nm, less than 2 nm or less than 1 nm. In some embodiments the pore size of the active surface layer is less than 0.01 nm or 0.1 nm.

In some embodiments the pore size of the active surface layer is between 0.5 nm-1 nm, between 0.1 nm-0.5 nm or between 0.01 nm-1 nm in diameter.

In some embodiments the active surface layer is about 100 nm thick. The active surface layer may range from 10 nm to 10,000 nm. In some embodiments the active surface later is less than 100 nm thick. In some embodiments the active surface layer is at least 10 nm, at least 20 nm, at least 30 nm, at least 40 nm, at least 50 nm, at least 60 nm, at least 70 nm, at least 80 nm, at least 90 nm or at least 100 nm thick.

Pore sizes (e.g., diameters) of the support layer may range from 500 nm to 50,000 nm.

In some embodiments the support layer is at least 500 nm, at least 600 nm, at least 700 nm, at least 800 nm, at least 900 nm, at least 1000 nm, at least 1100 nm, at least 1200 nm, at least 1300 nm, at least 1400 nm, at least 1500 nm, at least 1600 nm, at least 1700 nm, at least 1800 nm, at least 1900 nm, at least 2000 nm, at least 2100 nm, at least 2200 nm, at least 2300 nm, at least 2400 nm, at least 2500 nm, at least 2600 nm, at least 2700 nm, at least 2800 nm, at least 2900 nm, at least 3000 nm, at least 3100 nm, at least 3200 nm, at least 3300 nm, nm least 3400 nm, at least 3500 nm, at least 3600 nm, at least 3700 nm, at least 3800 nm, at least 3900 nm, at least 4000 nm, at least 4100 nm, at least 4200 nm, at least 4300 nm, nm least 4400 nm, at least 4500 nm, at least 4600 nm, at least 4700 nm, at least 4800 nm, at least 4900 nm, at least 5000 nm, at least 10,000 nm, at least 20,000 nm, at least 30,000 nm or 40,000 nm thick. The support layer may range from 100 to 100,000 nm in thickness.

One embodiment of the invention provides an organic membrane comprising a nanoporous active selective layer, wherein the nanoporous active selective layer comprises a plurality of pores, the pores having:
  (i) substantially uniform diameters of less than 5 nm;
  (ii) standard deviations of the substantially uniform pore diameters of less than 1 nm; and
  (iii) substantially uniform orientations which are approximately perpendicular to surfaces of the membrane.

In one embodiment, the films or membranes are fabricated from self-assembled triblock terpolymers.

Another aspect of the invention utilizes triblock terpolymers that self-assemble into regular structures on the nanoscale to template the pore structure of our membranes, which can result in a membrane that contains a high density of monodisperse pores, a structural feature that current membranes lack. The pore size can be tuned by using well-designed chemical syntheses to control precisely the molecular weight and the molecular weight distributions of the self-assembling macromolecules. In another aspect of the invention, the films or membranes will contain a plurality of singly-sized pores per square meter. In some embodiments, the membranes or films may have more than $10^{14}$, $10^{15}$, $10^{16}$, $10^{17}$, $10^{18}$ or $10^{19}$ pores per square meter.

Membrane Functionalization

In one aspect, the macromolecule can be designed so that after fabricating large membrane areas using the scalable SNIPS process, the membrane pores are lined by a functional moiety that can readily be converted in the solid state to a myriad of functional groups. This process allows for a "molecule-to-module" control of the membranes. This, in turn, allows for the development of structure-property-performance relationships in established and emerging membrane separations. Importantly, these relationships can be utilized to optimize the design of membranes in a rational and systematic manner.

Furthermore, the pore chemistry of the membrane can be tailored for the specific needs of a given separation by controlling the chemical constituents and the distribution of functionality along the polymer backbone of the macromolecule.

According to the present invention, the membranes may be functionalized at the surface, internally or at an interface, such as the internal face of a pore. Such functionalization includes the incorporation of a reactive group. Examples of reactive groups or moieties which may be incorporated into the membranes of the present invention include, but are not limited to an alcohol, hydroxyl, carbonyl, aldehyde, thiol, ketone, acyl halide, carbonate, carboxylate, carboxylic acid, ester, methoxy, hydroperoxide, peroxide, ether, hemiacetal, hemiketal, acetal, ketal, acetal, orthoester, heterocycle, orthocarbonate ester, amide, amine, imine, imide, azide, cyanate, nitrate, nitrile, nitrite, nitro compound, nitroso compound, pyridine, pyridine derivative, thiol, sulfide, thioether, disulfide, sulfoxide, sulfone, sulfinic acid, sulfonic acid, thiocyanate, thione, thial, phosphine, phosphane, phosphonic acid, phosphate, phosphodiester, boronic acid, boronic ester, borinic acid, borinic ester, carboxylic acid, alkyl group and a combination thereof.

In some embodiments, the functionalization varies with pH, the wet/dry state, or with temperature. For example, functionalization may comprise a zwitterionic moiety whose ionic state varies with pH. Such versatility in a membrane expands the use of the membranes or films or devices to areas of technology or biology (including agriculture) where environmental conditions dictate unique requirements for separation, filtration, purification or concentration of a material (e.g., solid, liquid or gas).

III. Polymers of the Invention

A polymer is a structure composed of one or more monomers. A polymer made from two monomer species is referred to as a copolymer. A copolymer can be further categorized based on the distribution of the monomeric units. For example a copolymer with monomeric species "A" and "B" could be referred to as an alternating copolymer if the monomeric units are distributed in an alternating fashion such as A-B-A-B. A copolymer with monomeric distribution in a pattern such as AAA-BBB is referred to as a block copolymer as the species are arranged in blocks along the polymer. The homopolymer units in a block copolymer are typically linked by a covalent bond. The same basic architecture of block copolymers can be extended to more complex configurations. For instance, triblock, tetrablock, or multiblock copolymers can also be created. Multiblock refers to an unspecified number of blocks that is greater than or equal to 2. Similarly, more complex polymers that are made up of more than two monomeric species. These may be referred to as terpolymer in the case of 3 monomeric species, tertrapolymers in the case of 4, or multipolymers in the case of an unspecified number of monomeric species that is greater than or equal to 2.

Membranes can be fabricated from a variety of different materials including inorganics, such as aluminum oxide or zeolites, and organic materials, including myriad polymers. Composite membranes, which incorporate inorganic entities within polymeric matrices, also are explored commonly in the hopes of combining the selectivity of highly-ordered inorganic structures with the mechanical robustness of polymeric materials. However, the versatility and ease of processing associated with polymeric systems make them the standard material for most conventional membrane fabrication.

Polymers useful in the present invention include, but are not limited to, polystyrenes, polyesters, polyamides, polyethylene glycols, polyethers, polyetherimides, polyvinylalcohols or polyvinylchlorides and derivatives or combinations thereof. Polymers may be biodegradeable or biocompatible. They may be purchased from any supplier, for example Sigma Aldrich (Natick, Mass.) supplies PEG-b-PLA, PEG-b-PLGA, PEG-b-PS, PEG-b-PCL, PEG-b-PE, PS-b-PMMA, PS-b-PA diblock copolymers, among others. As such, the Sigma Aldrich catalog is incorporated herein by reference in its entirety. Any of these copolymers may be used in the present invention.

According to the present invention, any of the monomers referenced herein, whether alone or as a component of a di- or tri-polymer may serve as a monomer of the invention.

Examples of monomers useful in the present invention include, but are not limited to DMA, tBMA, poly((4-vinyl) pyridine), poly((2-vinyl) pyridine), poly (ethylene oxide), poly(methacrylates) such as poly(methacrylate), poly(methyl methacrylate), poly(dimethylethyl amino ethyl methacrylate), poly(acrylic acid), and poly(hydroxystyrene).

Examples of copolymers useful in the present invention include, but are not limited to, poly(styrene)-b-poly((4-vinyl) pyridine), poly(styrene)-b-poly((2-vinyl) pyridine), poly(styrene)-b-poly(ethylene oxide), poly(styrene)-b-poly (methyl methacrylate), poly(styrene)-b-poly(acrylic acid), poly(styrene)-b-poly(dimethylethyl amino ethyl methacrylate), poly(styrene)-b-poly(hydroxystyrene), poly($\alpha$-methyl styrene)-b-poly((4-vinyl) pyridine), poly($\alpha$-methyl styrene)- b-poly((2-vinyl) pyridine), poly(α-methyl styrene)-b-poly(ethylene oxide), poly(α-methyl styrene)-b-poly(methyl methacrylate), poly(α-methyl styrene)-b-poly(acrylic acid), poly(α-methyl styrene)-b-poly(dimethylethyl amino ethyl methacrylate), poly(α-methyl styrene)-b-poly(hydroxystyrene), poly(isoprene)-b-poly((4-vinyl)pyridine), poly(isoprene)-b-poly((2-vinyl) pyridine), poly(isoprene)-b-poly(ethylene oxide), poly(isoprene)-b-poly(methyl methacrylate), poly(isoprene)-b-poly(acrylic acid), poly(isoprene)-b-poly(dimethylethyl amino ethyl methacrylate), poly(isoprene)-b-poly(hydroxystyrene), poly(butadiene)-b-poly((4-vinyl)pyridine), poly(butadiene)-b-poly((2-vinyl) pyridine), poly(butadiene)-b-poly(ethylene oxide), poly(butadiene)-b-poly(methyl methacrylate), poly(butadiene)-b-poly(acrylic acid), poly(butadiene)-b-poly(dimethylethyl amino ethyl methacrylate), and poly(butadiene)-b-poly(hydroxystyrene).

It is understood that monomers and copolymers may be combined in any order to produce a terpolymer or triblock copolymer. Examples of these include, but are not limited to, poly(isoprene-b-styrene-b-4-vinylpyridine), poly(isoprene)-b-poly(styrene)-b-poly((4-vinyl)pyridine), poly(isoprene)-b-poly(styrene)-b-poly((2-vinyl) pyridine), poly(isoprene)-b-poly(styrene)-b-poly(ethylene oxide), poly(isoprene)-b-poly(styrene)-b-poly(methyl methacrylate), poly(isoprene)-b-poly(styrene)-b-poly(acrylic acid), poly(isoprene)-b-poly(styrene)-b-poly(dimethylethyl amino ethyl methacrylate), poly(isoprene)-b-poly(styrene)-b-poly(hydroxystyrene), poly(isoprene)-b-poly(α-methyl styrene)-b-poly((4-vinyl) pyridine), poly(isoprene)-b-poly(α-methyl styrene)-b-poly((2-vinyl) pyridine), poly(isoprene)-b-poly(α-methyl styrene)-b-poly(ethylene oxide), poly(isoprene)-b-poly(α-methyl styrene)-b-poly(methyl methacrylate), poly(isoprene)-b-poly(α-methyl styrene)-b-poly(acrylic acid), poly(isoprene)-b-poly(α-methyl styrene)-b-poly(dimethylethyl amino ethyl methacrylate), poly (butadiene)-b-poly(styrene)-b-poly((4-vinyl)pyridine), poly(butadiene)-b-poly(styrene)-b-poly((2-vinyl) pyridine), poly(butadiene)-b-poly(styrene)-b-poly(ethylene oxide), poly(butadiene)-b-poly(styrene)-b-poly(methyl methacrylate), poly(butadiene)-b-poly(styrene)-b-poly(acrylic acid), poly(butadiene)-b-poly(styrene)-b-poly(dimethylethyl amino ethyl methacrylate), poly(butadiene)-b-poly(styrene)-b-poly(hydroxystyrene), poly(butadiene)-b-poly(α-methyl styrene)-b-poly((4-vinyl) pyridine), poly(butadiene)-b-poly(α-methyl styrene)-b-poly((2-vinyl) pyridine), poly(butadiene)-b-poly(α-methyl styrene)-b-poly(ethylene oxide), poly(butadiene)-b-poly(α-methyl styrene)-b-poly(methyl methacrylate), poly(butadiene)-b-poly(α-methyl styrene)-b-poly(acrylic acid), poly(butadiene)-b-poly(α-methyl styrene)-b-poly(dimethylethyl amino ethyl methacrylate), and poly(butadiene)-b-poly(styrene)-b-poly(hydroxystyrene).

Examples of hydrophobic synthetic polymers useful in the present invention include polyacetals, polyolefins, polycarbonates, polystyrenes, polyesters, polyamides, polyamideimides, polyarylates, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyethylene terephthalate, polybutylene terephthalate, polyurethane, polytetrafluoroethylene, polychlorotrifluoroethylene, polyvinylidene fluoride, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphtalides, polyacetals, polyvinyl ethers, polyvinyl thioethers, polyvinyl ketones, polyvinyl halides, polyvinyl nitriles, polyvinyl esters, polysulfides, polythioesters, polysulfones, polysulfonamides, polyureas, polyphosphazenes, polysilazanes, polysiloxanes, polyolefins, or the like, or a combination comprising at least one of the foregoing polymers.

Examples of hydrophilic synthetic polymers useful in the present invention include polyarylsulfones, polyanhydrides and polysulfonates and combinations thereof.

Several novel materials have recently been proposed as a possible way of making membranes with higher permeability including the use of carbon nano-tubes (CNTs), graphene or use of aquaporins in membranes. (Aquaporins are the proteins responsible for water filtration in many human and animal cells). While these approaches have the potential to deliver very high flow rates, there are significant manufacturing challenges with developing these types of membranes at a larger scale. The present invention contemplates the use of such non-traditional polymer substances.

Polymers: Self Assembling.

As the development of nanoscale mechanical, electrical, chemical and biological devices and systems increases, new processes and materials are needed to fabricate nanoscale devices and components. The use of self-assembling block copolymers presents another route to patterning at nanometer dimensions. The self-assembly properties of certain types of polymers broadly defined as block copolymers have been investigated as a possible approach to making membrane materials.

One embodiment of the invention provides a method for forming a nanostructured membrane of a self-assembled A-B-C multiblock copolymer, the method comprising the steps of:

a) synthesizing the self-assembled A-B-C multiblock copolymer using a controlled radical polymerization mechanism; and
b) fabricating the nanostructured membrane from the self-assembled A-B-C multiblock copolymer using a non-solvent induced phase separation [SNIPS];
wherein the multiblock copolymer comprises a terpolymer that comprises polyisoprene-b-polystyrene-b-poly(N,N-dimethylacrylamide) [PI-PS-PDMA] or polyisoprene-b-polystyrene-b-poly(tert-butylmethacrylate) [PI-PS-PtBMA].

Another embodiment of the invention provides a nanostructured membrane of a self-assembled A-B-C multiblock copolymer, wherein the copolymer comprises a terpolymer that comprises polyisoprene-b-polystyrene-b-poly(N,N-dimethylacrylamide) [PI-PS-PDMA] or polyisoprene-b-polystyrene-b-poly(tert-butylmethacrylate) [PI-PS-PtBMA].

Any of the polymers disclosed herein or known to those of skill in the art may be utilized to generate self-assembled polymeric structures of the invention.

The self-assembly of block polymers occurs due to an inherent tradeoff that occurs while the materials attempt to reach a lowest-energy conformation. In particular, the macromolecules attempt to minimize the enthalpic penalty associated with interactions between chemically-incompatible blocks while also minimizing the amount of chain stretching (as chain stretching decreases the amount of configurational entropy associated with the macromolecules increases). As such, the block polymers self-assemble on a less than 1 nm to 100 nm length scale, as they are limited by the inherent lengths of their molecular bonds. The exact geometries, domain spacings, and alignments of these block polymers can be controlled simply by tailoring the chemistry and processing of these nanomaterials.

IV. Uses of the Membranes, Polymers, and Methods of the Invention

According to the present invention, the membranes, films and/or devices described herein may be used to effect separations, concentrations, purifications, extractions, chromatography, or filtrations of solid, liquid or gaseous mediums, either alone or in combination. In some cases the goal may be to collect the separated materials, such as the extraction of oil or valuable minerals or materials from water sources. In other embodiments, these two goals may be simultaneously pursued, with the objective of cleaning water and at the same time collecting and extracting value from some of the removed contaminants.

Water Treatment, Purification, and Separations

In various embodiments, the invention provides methods of preparing multiblock copolymers and methods for using the membranes, including membranes that have important filtration properties. In this context, the present invention finds utility in processes to purify, desalinate, or decontaminate water sources in order to obtain cleaner water.

Fresh water is an increasingly-scarce world resource and there is a growing demand for more efficient and productive ways to clean contaminated water sources and to create more fresh water. Membrane technologies have been established as the predominant water treatment technology and are used in various different systems ranging from microfiltration (MF), ultrafiltration (UF), nanofiltration (NF), and reverse osmosis (RO) membranes. These membranes can be classified based on their typical pore sizes, which are summarized in the Table 1. While there are slight variations in the exact definition of these pore size ranges across the literature, and while there is no official definition, most definitions are relatively similar.

The ubiquity of water treatment schemes is not surprising given its fundamental connection to life. The membranes and films of the present invention may be used across a wide range of applications, including treating waste water in membrane bio-reactors, treating oil and gas water to meet discharge requirements, remediation of contaminated waters from mining operations, desalinating seawater, brackish water desalination, municipal water treatment, viral separations in bio-pharmaceutical manufacturing, treating of power plant cooling water, food and beverage manufacturing, pulp and paper processing, and many more applications. A person skilled in the art will understand that the same types of membranes, methods or processes applied to any given aqueous substance can be applied to numerous other applications.

TABLE 1

| Membrane types and pore size | |
| --- | --- |
| Membrane type | Pore Size |
| Microfiltration (MF) | 1,000-100 nm |
| Ultrafiltration (UF) | 100-10 nm |

TABLE 1-continued

| Membrane types and pore size | |
| --- | --- |
| Membrane type | Pore Size |
| Nanofiltration (NF) | 10-1 nm |
| Reverse Osmosis (RO) (also Forward Osmosis (FO)) | <1 nm |

There are substantial differences in the mechanisms by which these membranes are able to operate successfully. MF membranes are capable of disallowing passage of bacteria and suspended solids but tends to allow the passage of viruses, ions, and water molecules as these are smaller in size and can easily pass through the MF membranes' relatively large pores. In addition to what a MF membrane is capable of excluding, MF membranes can also be used to remove viruses, and as we move onto the smaller pore sizes of NF membranes some of the larger multivalent ions can also be removed. Reverse osmosis membranes can effectively remove even the smallest of dissolved ions and mostly allows only the passage of water molecules, which are smaller in size than most ions. MF, UF and NF membranes' selectivity is based substantially on a size-exclusion mechanism, where only matter that is smaller than the membrane pore size is capable of passing through the membrane, while matter that is larger than the pore sizes is disallowed passage through the membrane. In order for the membrane to be effective there needs to be a low pore size variability such that most of the pores are of substantially similar size. Otherwise, a membrane's selectivity would be compromised, as larger matter would be able to pass through the larger pores.

Current technology has not been capable of creating an RO membrane with consistently-sized pores in the sub 1 nm range. Instead, current RO membranes are created with tortuous paths, such that any molecule that traverses the membrane travels a distance that is usually much larger than the thickness of the membrane. These paths through the membrane can be thought of as a complex networked mesh of pores and apertures that are connected by passages of varying sizes. Traversing this circuitous path through the membrane is easier for small water molecules as there are numerous possible paths that it can take as it crosses the membrane. Being larger in size, dissolved ions have a much more difficult time finding a path through the membrane that they can fit through and will tend to take a longer path as they traverse the membrane. The net result is that the membrane allows the passage of water molecules at a rate that is orders of magnitude higher than the rate at which ions can pass. This difference in permeabilities results in the very high rejection rates seen in today's RO membranes. One of the consequences of this membrane architecture is that it reduced the attainable flow rate through the membrane. Current RO membranes suffer from disappointingly low permeabilities and also require a higher operating pressure to overcome the low permeability. These factors translate into higher operating costs and capital costs. In contrast to UF and MF that tend to be low-pressure applications, RO systems are typically high-pressure applications. The minimum amount of energy needed in order to separate the dissolved solutes from the water solution is known as the osmotic pressure. RO systems must operate at a pressure that is higher than the osmotic pressure. An alternative approach to RO is the use of forward osmosis (FO) membranes. In FO instead of applying pressure to overcome the osmotic pressure gradient, FO systems expose one side of the membrane to a solution that has a higher osmotic pressure which acts as a draw solution and results in the flow of water from the low osmotic pressure solution to the high osmotic pressure solution.

The membranes and films of the present invention solve these problems.

Bioseparations

In addition to water treatment, ultrafiltration (~10-100 nm pore size) and nanofiltration (~1-10 nm in pore size) membranes are widely-used to effect size-selective separations in the pharmaceutical industries. For example, metals, bacteria, viruses, and other organic matter have been separated selectively from aqueous solutions using ultrafiltration (UF) and nanofiltration (NF) membranes. Furthermore, UF and NF membranes have been used to mediate mass transfer in drug delivery, micropatterning, and biological sensing and immobilization applications. As such, controlling the material compositions and nanostructures of these technology platforms is of prime import. The membranes of the present invention address these problems.

Furthermore, membrane separation technologies are used heavily in the purification of monoclonal antibodies (mAbs). However, current commercial membranes do not allow for high throughput processing, which leads to high costs for these therapeutics, and thus, their reduced usage in clinical settings. The high cost of large-scale mAbs production and isolation has hampered their widespread usage in clinical settings. While membrane technologies dominate the mAbs purification market, currently-used commercial membranes rely on an active layer structure with a wide distribution of pore sizes, which hinders their use in the step that brings the final drug purity to the high level demanded of modern therapeutics. This situation results in the need to use chromatography columns, which greatly lowers throughput and increases patient costs. As such, a need exists for a high throughput, low-cost biopharmaceutical purification technique with easily tunable selectivity toward specific biochemicals in order to advance the clinical treatment and health of a wide variety of patients.

The present invention improves the design of bioseparations devices in order to create high flux and high throughput membranes for improved production and lowered costs of biopharmaceuticals. The present invention embraces and characterizes novel multiblock copolymers that self-assemble into useful nanoscale structures. This next-generation "molecule-to-module" approach allows one to design high performance biomedical separations devices in an unambiguous and straightforward manner. The unique ability to tune membrane nanostructure and tailor pore chemistry allows energy-efficient, environmentally responsible-separation devices to be deployed in place of current technologies.

Remediation and/or Removal of Harmful Elements, Isotopes or Biomolecules

According to one aspect of the present invention, the membranes or films may be used to remove certain harmful elements from water sources. One such application is the removal of selenium. In one embodiment, the membranes or films of the present invention are used alone or in a device for the purpose of clearing or cleaning water run off or in remediation of water for purposes other than drinking.

In another approach, magnesium may be removed from seawater using the membranes or films of the present invention. In one embodiment such membranes may be used in conjunction with, either tandem or serially, with traditional RO systems.

In like fashion, radioactive isotopes may also be removed from water sources or waste water. Biomolecules such as hormones (e.g., estrogen) may be removed from water supplies using the membranes, films or devices of the present invention.

Semiconductor Industry

According to another aspect of the present invention, the membranes and/or films or devices comprising the same, may be used in the semiconductor industry for the production of ultra-pure water.

Military and Field Applications

According to yet another aspect of the present invention, the membranes, films and devices are useful to be deployed in remote or exigent circumstances including but not limited to remote areas, military installations, situations involving urgent or disaster relief, humanitarian missions and the like.

EXAMPLES

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

Example 1. General Methods

Nuclear Magnetic Resonance (NMR)

The 1H NMR spectra were measured on a Bruker DRX500 spectrometer using a ~1 wt % polymer solution in deuterated chloroform (Sigma-Aldrich). Size exclusion chromatography (SEC) data were collected on a Hewlett-Packard 1260 Infinity series equipped with a Hewlett-Packard G1362A refractive index (RI) detector and three PLgel 5 μm MIXED-C columns. The mobile phase was comprised of tetrahydrofuran (THF) at 35° C. at a flow rate of 1 mL min-1 The SEC was calibrated using polystyrene standards (Agilent Easi Cal) with molecular weights ranging from 1 kg mol$^{-1}$ to 200 kg mol$^{-1}$. Differential scanning calorimetry (DSC) data were collected using a TA Instruments Q20 Series differential scanning calorimeter. The samples were initially heated to 200° C., held isothermally for 10 minutes before being cooled to −75° C. under a nitrogen gas purge. The data shown are from the final scan from −75° C. to 200° C. at 10° C. min$^{-1}$.

Attenuated Total Internal Reflectance-Fourier Transform Infrared (ATR-FTIR)

Attenuated total internal reflectance-Fourier transform infrared (ATR-FTIR) spectroscopic measurements were acquired using a Thermo-Nicolet Nexus FTIR equipped with a diamond substrate. Under a constant purge of nitrogen, the ATR-FTIR data was collected in 32 scans in the range of 4500-800 cm$^{-1}$ using a DTGS KBr detector and KBr beam splitter. Small angle x-ray scattering (SAXS) measurements of the powder, containing ~1% (by weight) butylated hydroxytoluene (BHT), were prepared by pressing a 2 mm thick polymer disc into a washer using a Carver press. The powder sample was then annealed at 180° C. for 24 h under vacuum and then cooled to room temperature. SAXS experiments were conducted at beamline 1-4 of the Stanford Synchrotron Radiation Laboratory (SSRL).

Monomers and Solvents.

All chemicals were purchased from Sigma-Aldrich unless otherwise noted. Degassed, inhibitor free tetrahydrofuran (THF) (Sigma-Aldrich) was purified by passage through an alumina column (Innovative Technology). Isoprene, styrene, and N,N-dimethylacrylamide were purified by passage through a basic alumina (Fisher Scientific) column prior to use. A Millipore water purification system (Milli Q Advantage A10, Millipore Corporation, Bilerica, Mass.) provided deionized water, which was used as the non-solvent during membrane fabrication, in preparing solutions for permeability and solute rejection tests, and for rinsing the test cell at the conclusion of an experiment.

Polymer Synthesis and Characterization.

Synthesis of Polyisoprene. A reversible addition-fragmentation chain transfer (RAFT) polymerization mechanism was utilized for the synthesis of polyisoprene (see Jitchum and Perrier, *Macromolecules* 2007, 40, 1408-1412; Germack et al., *J. Polym. Sci., Part A: Polym. Chem.* 2007, 45, 4100-4108). The polymerization was performed in a 25 mL vacuum flame-dried reaction flask containing a Teflon-coated magnetic stir bar. 15 mL (0.15 mol) of isoprene, 24.2 mg (0.07 mmol) of 2-(dodecylthiocarbonothioylthio)-2-methylpropanoic acid (chain transfer agent) and 2.5 µL (0.01 mmol) of tert-butyl peroxide were added to the reaction flask. Once the solids were dissolved completely in the solution, four freeze-pump-thaw cycles were performed. Next, the reaction flask was refilled with argon and the reaction was heated to 120° C. The solution in the reaction flask was stirred at 120° C. for 40 hours. The mixture was cooled to room temperature, precipitated in methanol three times, and the product (PI) dried under vacuum for 24 hours ($M_n$=14.2 kDa via 1H NMR; Đ=1.3).

Synthesis of Polyisoprene-b-Polystyrene. The polymerization was performed in a 25 mL flame-dried reaction flask containing a Teflon-coated magnetic stir bar. 0.94 g (0.07 mmol of chain transfer end groups) of PI, 11.6 mL (0.10 mol) of styrene, 1.4 mole equivalents of dioxane (0.14 mol, 12.0 mL), and 0.872 mg of AIBN (5.3 µmol) were added to the reaction flask. Once the solids were dissolved completely in the solution, four freeze-pump-thaw cycles were performed. Next, the reaction flask was refilled with argon and the reaction was heated to 60° C. The reaction was stirred at this temperature for 4.25 days. The mixture was cooled to room temperature, precipitated in methanol three times, and the product (PI-PS) was dried under vacuum for 24 hours ($M_n$=45.3 kDa via 1H NMR; Đ=1.2).

Synthesis of Polyisoprene-b-Polystyrene-b-Poly(N,N-Dimethylacrylamide). The synthesis of the PDMA block was performed in a 100 mL flame-dried reaction flask containing a Teflon-coated magnetic stir bar. 1 g (22.0 µmol of chain transfer end groups) of PI-PS, 15.8 mL (0.15 mol) of N,N-dimethylacrylamide, 3 volume equivalents of THF (47.5 mL) and 0.45 mg (2.8 µmol) of AIBN were added to the reaction flask. Once the solids were dissolved completely in the solution, four freeze-pump-thaw cycles were performed. Next, the reaction flask was refilled with argon and the reaction was heated to 60° C. The reaction was stirred at this temperature for 1.3 hours. The mixture was cooled to room temperature, precipitated in cold hexanes three times, and the product (PI-PS-PDMA) dried under vacuum for 24 hours ($M_n$=68.6 kDa via 1H NMR; Đ=1.3).

Membrane Fabrication and Structural Characterization.

Membrane Casting Procedure. Membranes were cast using the self-assembly and non-solvent induced phase separation (SNIPS) method. The casting solutions were prepared by dissolving the PI-PS-PDMA terpolymer at a concentration of 15 wt % in a 70/30 (w/w) mixture of dioxane and tetrahydrofuran. After the terpolymer was dissolved completely, the solution was allowed to sit unstirred overnight to ensure no air bubbles were trapped in solution.

To prepare a membrane, the solution was drawn into a thin film on a glass substrate using a doctor blade set at a gate height of 254 µm. After casting, the solvent was allowed to evaporate from the film for 75 s, and the film was plunged subsequently into a non-solvent (DI water) bath to induce polymer precipitation. After fabrication, membranes were stored in DI water to prevent drying and cracking of the films.

Preparation of Membrane Samples for Structural Characterization. In preparation for scanning electron microscopy (SEM) analysis, 1 cm×1 cm sections of the membranes were cut from larger sheets, air-dried, and then fixed onto a standard SEM pin stub mount (Ted Pella Inc., Redding, Calif.) using carbon tape. For cross-sectional micrographs, dried samples were submerged in liquid nitrogen for 15 seconds and then cracked before being taped onto a vertically-walled SEM pin stub. All samples were sputter-coated with 1.5 nm of iridium prior to loading them into a Magellan 400 Field Emission Scanning Electron Microscope. Micrographs were produced using a working distance of 3 mm and an accelerating voltage between 1-3 kV.

To prepare a membrane sample wetted with ionic liquid for SEM imaging, the membrane was fixed on a pin stub and 2-3 drops of ionic liquid were placed on top of the membrane. After allowing the ionic liquid to soak into the membrane for 5 minutes, the surface was wiped with a lint-free tissue to remove the excess liquid. The sample was then coated with 1.5 nm of iridium, and another 1-2 drops of ionic liquid were added. After the removal of excess liquid, the samples were dried in a vacuum oven to remove residual water.

AFM experiments were carried out as described in the literature (Jing et al., *Chem. Sci.* 2013, 4, 3818-3826, the contents of which are incorporated herein by reference in their entirety). The characterization was performed in tapping mode (Multimode, Nanoscope IV Controller, Veeco) with a waterproof scanner (J Scanner, Veeco) and a silicon nitride probe (NP, Veeco). The PI-PS-PAA sample was tested in dry state and in two aqueous buffer solutions, 50 mM acetic acid (pH=2.98) and 50 mM ammonium acetate (pH=6.88). The apparatus was washed thoroughly after each image with buffer solutions.

Solid State PDMA to Poly(Acrylic Acid) (PAA) Conversion Protocol.

The conversion of the PDMA domain to PAA is based on protocols described in the literature (Rzayev and Hillmyer, *J. Am. Chem. Soc.* 2005, 127, 13373-13379). A section of the membrane was submerged in a 6 M HCl aqueous solution at 85° C. for a predetermined period of time. After removal from the acidic solution, the membrane material was washed repeatedly in DI water. The converted membrane was then analyzed using ATR-FTIR spectroscopy and transport testing.

Transport Tests (Solvent Flow, Solute Rejection, and Gas Permeability).

Stirred Cell Experimental Design. Transport tests were performed in a 10 mL Amicon 8010 stirred cell. A 1-inch-diameter circular section of a PI-PS-PDMA (or PI-PS-PAA) membrane was fabricated using a standard hand punch. A 1-inch diameter piece of Crane calendered PP/PE nonwoven microporous substrate was placed in the bottom of the stirred cell for support, and the membrane was placed on top of this support. The stirred cell was filled with 10 mL of solution, then capped, and pressurized with nitrogen. The permeating solution was collected in a vial that rested on a balance. The mass of the vial was collected at regular intervals in order to calculate the water flux. The hydraulic permeability of the membrane was determined by measuring the water flux at various applied pressures.

pH-Dependent Permeability Tests. The hydraulic permeability was measured using solutions of varying acidity and basicity for the parent and PAA-functionalized membranes. Acidic solutions (1<pH<3) were prepared using hydrochloric acid, and citric acid was used to prepare solutions from pH ranging from 3 to 5. Basic solutions from pH 7 to pH 10 were made using tris(hydroxymethyl)aminomethane (TRIS), and sodium hydroxide was used to prepare solutions of pH 11 to pH 13. Values for the pH were measured using an Accumet AP115 portable pH meter (Fisher Scientific, Waltham, Mass.) before adding the solution into the cell.

Molecular Weight Cut Off Experiments and Analysis. Polyethylene oxide (PEO) samples with molecular weights of 1.1, 2.1, 4.0, 6.0, 7.8 and 10.0 kDa were purchased from Polymer Source (Montreal, Quebec, Canada), with the dispersity values of 1.10 or lower for all molecular weights. For the molecular weight cut off (MWCO) tests, a single PEO sample was dissolved in DI water at a concentration of 1 g L-1 and added to the stirred cell. During these experiments, the cell was stirred at 400 rpm to prevent concentration polarization. The permeating solution was collected in scintillation vials. The first 1.5 mL of permeate was discarded to eliminate contamination by any residual solution inside the membrane not cleared during washing. Two clean vials were used to collect 1.5 mL each of the permeate samples. The vials were then covered with Parafilm and refrigerated to prevent water evaporation. A 2-mL sample of the feed solution for each experiment was stored in the same way. The cell was emptied and washed three times with DI water between each test.

The permeate and feed samples from each experimented were diluted by a factor of 20 with DI water, and a Shimadzu TOC-TN Organic Carbon Analyzer was used to quantify the concentration of PEO in the solutions. The percent rejection was calculated according to the following equation.

$$R\ (\%) = 100\% \times \left(1 - \frac{c_p}{c_f}\right)$$

Here, $c_p$ and $c_f$ represent the concentrations of PEO in the permeate and feed, respectively.

Gas Diaphragm Cell Testing. Membrane samples were dried and taped to a stainless steel disc with 1 mm circular opening in the center. The top of the membrane was covered with epoxy leaving only the area of the membrane above the 1 mm opening exposed. After the epoxy cured, the disc was placed inside a diaphragm cell between two 1 L cylinders. After purging with the system with gas, one cylinder was filled to 12 psig, the other was vented to atmospheric pressure (0 psig), and the system was closed. The pressures of the high-pressure donating and low-pressure receiving cylinders were monitored as a function of time. The data was used to calculate the membrane permeability (Phillip et al., *J. Membr. Sci.* 2006, 286, 144-152). The experiment proceeded until the change in pressure had exceeded 2 psi.

Example 2. Controlled Synthesis of A-B-C Triblock Terpolymers and Selective Conversion of Chemical Functionalization Important to the successful formation of triblock terpolymer membranes for environmentally-friendly advanced separations processes is the synthesis of well-controlled and well-designed macromolecules. By rational design of chemical reaction mechanisms and chemical functionality, one can generate triblock terpolymers with easily controllable and highly tunable molecular weights, molecular weight distributions, and chemical compositions. Manipulating these three parameters using controlled polymerization chemistry allows one to tune the domain geometries and membrane porosities in a systematic manner, which is useful to the development of valuable structure-property relationships.

The use of a controlled polymerization technique facilitates narrow molecular weight distributions for the block copolymers. This parameter is important so that the triblock terpolymers will self-assemble into ordered structures with monodisperse pore sizes. These two aspects are important to the final separations ability of the fabricated membranes. The controlled radical polymerization mechanism may be designed to be readily scaled to large batches. In that way, the fundamentally new materials described herein can be transferred to the commercial-scale membrane technology platforms of the future in a relatively straightforward manner. This provides a distinct advantage over many block copolymer materials proposed for use in membrane technologies as the synthetic scheme described herein does not require as stringent of reaction conditions as many other block copolymer synthesis routes (e.g., anionic polymerization). As such, these new triblock terpolymer materials offer an initial pathway to a safer, more environmentally-aware, and secure future for the world.

Specifically, we employed the reversible addition-fragmentation chain transfer-mediated (RAFT-mediated) radical polymerization mechanism. This scheme generates A-B-C triblock terpolymers, macromolecules where there are three segments of unique chemical design along the length of the polymer chain (i.e., A, B, and C polymer moieties in Scheme 1), through sequential polymerization of isoprene, styrene, and tert-butylmethacrylate monomers.

The polyisoprene (PI) and polystyrene (PS) moieties of the triblock terpolymer have been proven to add a high degree of mechanical robustness to the membrane. Previously, RAFT-mediated polymerizations have been utilized to generate PI-PS diblock copolymers with relative ease (Germack et al., J. Polym. Sci., Part A: Polym. Chem. 2007, 45, 4100-4108). We have found this to be the case in our investigations. As such, we have been able to generate a number of PI-PS diblock copolymers using reaction conditions that required a low solvent to monomer ratio and minimal purification methods prior to polymerization (i.e., simple freeze-pump-thaw cycles).

Using these easily-scalable reaction conditions, we were able to synthesize PI-PS diblock copolymers with relatively high molecular weights (total block copolymer Mn>80 kg mol$^{-1}$, as determined by $^1$H NMR end group integration) and relatively narrow molecular weight distributions (Đ <1.4, as determined using size exclusion chromatography (SEC) against polystyrene standards. The fact that the chain transfer agent is still bound covalently to the PI-PS chain allows for the facile macroinitiation of the third monomer, tert-butylmethacrylate, and the subsequent polymer is found to be polyisoprene-b-polystyrene-b-poly(tert-butylmethacrylate) (PI-PS-PtBMA). The present experiment demonstrated the initial proof of this polymerization scheme. Therefore, using the PI-PS-RAFT to initiate the polymerization of tert-butylmethacrylate for a wide variety of PtBMA chain lengths is relatively straightforward. As such, one can synthesize a variety of molecular weights and molecular compositions (i.e., different lengths of A, B, and C blocks) in a quick and systematic manner. Importantly, these A-B-C terpolymers allow for the functionality of the membrane pore walls to be altered through simple chemical treatments.

Example 3. Conversion of PtBMA Block to a Poly(Methacrylic Acid) (PMAA) Functionality This important conversion affords yet another advantage over conventional block copolymer-based membrane technologies because one can then convert the PMAA functionality to a number of other chemistries with ease while in the solid state. The conversion from a carboxylic acid functionality to that of an alcohol, an alkene, or an amine has been shown to proceed in the nanochannels of solid state membranes with relative ease and with chemical conversions in excess of 90%.

To screen potential reagents for the conversion of PtBMA to PMAA conversion in the solid state, initial experiments have focused on simple reactions in solution, which build from established procedures in the literature (C. Fernyhough et al. *Soft Matter* 2009, 5, 1674-1682), the contents of which are incorporated herein by reference in its entirety. In particular, it was found that the addition of concentrated hydrochloric acid (HCl) to a solution of PtBMA homopolymer dissolved in tetrahydrofuran (THF) causes the hydrolysis of PtBMA to a PMAA polymer, as shown by the change in peak intensity and location of the 1H NMR spectra, in a manner akin to the more oft-used reagent of trifluoroacetic acid (TFA).

Importantly, when HCl is used as the hydrolysis reagent, a hydroxyl-conversion is not observed for the polyisoprene block, which is the case when TFA is used as the hydrolysis agent. In fact, TFA is well-known to react with the double bond along the backbone of the polyisoprene chain to leave a partially-hydroxylated polymer product. While the data indicate that the conversion of PtBMA to PMAA is not complete in the given reaction time, one can readily determine the appropriate reaction time and reaction temperature, such that conversion can be pushed to a relatively high level (i.e., greater than 90% conversion).

These data represent an important starting point for understanding the conversion of PtBMA to PMAA in the solid state (i.e., after the casting and formation of the membrane). Following these experiments, one can design experiments to include the ability to convert the functionalities of the macromolecules after self-assembly of the membrane structure. In this way, one can tune the chemistry of the pore walls of the membranes in the solid state.

Because all of the membrane active layers will be composed of the same base material, one can readily change the functionality of the membranes without changing the initial casting conditions. That is, in terms of technology transfer to large-scale production, one could envision making multitudes of square meters of the PI-PS-PtBMA membranes, selectively dicing these membranes to appropriate dimensions, and then altering the chemistry of each diced membrane area through simple dip-coating in the appropriate reaction mixture bath. This powerful scalability of the inventive membrane system allows for an increased throughput of production of membranes for reduced toxic materials usage in separation processes.

Example 4. Fabrication and Nanostructural Characterization

Of import to the operational efficiency of the proposed next-generation membranes is the ability to understand fully how the nanostructure of the chemically-active membranes affects transport and separations operations. We have established that the PI-PS-PtBMA macromolecules can microphase separate readily into domains with characteristic length scales ranging from less than 1 nm to 100 nm, which is of important utility in the separation of high-toxicity materials. The size and shape of these domains can be controlled in a facile manner by controlling the molecular weight of each of the constituent moieties.

Of importance to the end user will be the proper characterization of the pore sizes and nanostructure of the triblock terpolymer thin films. In order to characterize these inherently thin films, one can use atomic force, scanning electron, and transmission electron microscopy (AFM, SEM, and TEM) as well as small angle x-ray scattering (SAXS). In this way, the complete nanostructure of the resultant membranes can be understood prior to transport measurements. For instance, one can determine with certainty not only the pore size, but also the relative degree of pore alignment in the thin films using a 2-dimensional SAXS detector. This degree of alignment could alter greatly the transport properties and fouling propensity of the membranes. Furthermore, after the thin film has been deposited, the PtBMA brush, which coats the pores of the nanoporous PI-PS matrix, can be converted to poly(methacrylic acid) (PMAA) by exposing the membrane, in the solid state, to a mild hydrochloric acid solution as described above.

Previous studies have suggested that, in order to achieve the desired nanostructured pore design for facile separations processes, a solid state self-assembly of the triblock terpolymers into core-shell type hexagonally-packed cylinders is of significance. As such, one embodiment of the invention focuses on developing triblock terpolymers with molecular weights and polymer block compositions that have been shown to have these hexagonally-packed order in a similar polyisoprene-b-polystyrene-b-poly(methyl methacrylate) system. In this way, one can observe, in a relatively short time period, the solid state self-assembly of the materials into the desired nanostructure using small-angle x-ray scattering. A SAXS plot of a hexagonally-packed PI-PS-PtBMA triblock terpolymer in the solid state revealed that the domain spacing (as determined by the principle reflection, q*) was found to be ~38 nm, and the high number of reflections in the plot suggest that there is a high degree of microphase separation between the three components of the triblock terpolymer system.

Figure 2:
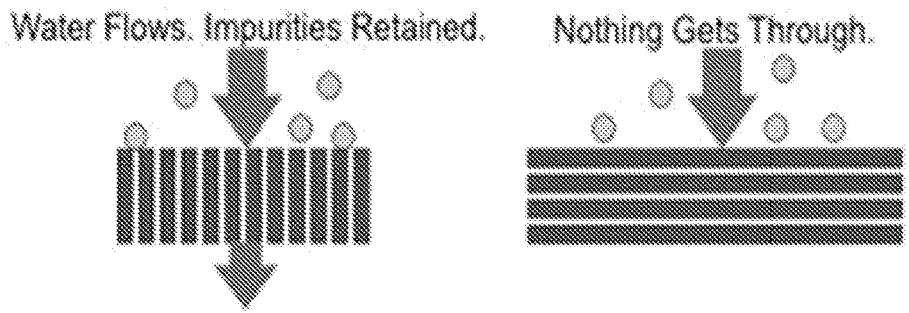
FIG. 2. Controlling the copolymer self-assembly is essential to membrane function. On the left, cylinders oriented perpendicular to the free surface produce membranes that function as highly effective membranes. On the right, cylinders oriented parallel to the free surface produce films that do not provide a useful function. Solvent selectivity and solvent evaporation rate are two processing conditions used in the self-assembly and non-solvent induced phase separation (SNIPS) membrane fabrication method that are known to affect cylinder orientation.

Using this PI-PS-PtBMA molecule, one can develop the protocol to make large membranes areas with controlled nanostructures. Specifically, ensuring proper orientation of the cylindrical domains is important to producing high performance membranes (FIG. 2). Solvent choice, polymer concentration in the casting solution, terpolymer composition, solvent evaporation rate, and evaporation time are processing conditions that have been shown to influence the ultimate nanostructure of the terpolymer-derived membranes. One can rationally modify these variables to produce membranes that contain a high density of monodisperse pores.

Initial attempts to fabricate membranes from the PI-PS-PtBMA terpolymer revealed a high density of well-structured nanopores. However, there was a small spread in the pore size. Further refinement of the polymer synthesis and SNIPS process allows one to produce membranes with a single pore size.

Thoroughly characterizing the membranes that result from the SNIPS process is important to optimizing the performance of the membranes in energy-saving, environmentally-aware separation processes. Therefore, one can use a suite of materials characterization techniques to fully characterize the membrane nanostructure.

In addition to SEM, visualizing the membrane using TEM and AFM techniques provides useful insights into the self-assembled structure of the membrane. Unfortunately, microscopy does not effectively demonstrate long-range order over large membrane areas. However, one can get this information through x-ray scattering. Transmission SAXS of casting solutions in the SNIPS process has been shown to be a good indicator of the final membrane structure. Moreover, grazing-incidence small-angle x-ray scattering (GI-SAXS) experiments performed during the casting process can also provide useful information about the mechanism.

Example 5. Solvent Flow and Solute Rejection Tests to Develop Structure-Property Relationships for Triblock Terpolymer-Based Membranes After fabricating large areas of membranes, and extensively establishing their nanostructure using x-ray scattering and microscopy techniques, it is essential to explore and understand the relationship between the membrane structure and its transport properties. Specifically, through an understanding of this relationship between structure and property one can rationally modify the membrane structure in order to optimize performance in the ultimate application. Furthermore, producing pore walls lined by PtBMA, which can easily be converted to PMAA, allows for the facile modification of the pore chemistry to a number of desired functionalities. The ability to readily tailor membrane structure and chemistry allows for more energy-efficient and environmentally responsible separations to be developed. Importantly, this relies on carefully testing the transport characteristics of the novel triblock terpolymer based membranes.

Two key transport properties, hydraulic permeability and selectivity, depend strongly on the membrane nanostructure. Permeability is a measure of how rapidly material can pass through the membrane; and membrane selectivity determines how well a membrane can distinguish between two solutes of differing size and/or chemistry. Ideally, a membrane will be both highly permeable and highly selective. The high density of nanopores in the inventive terpolymer films allows the membranes to be highly permeable, and the narrow pore size distribution makes the membrane highly size-selective. Furthermore, the ability to tailor the chemistry of the pore walls provides the ability to attach binding ligands to the pore wall. This makes the inventive membranes chemically selective. A combination of water flow and solute rejection tests, which are described below, can be used to assess permeability and selectivity.

The hydraulic permeability of the membranes, $L_p$, can be measured using well-established water flow experiments. $L_p$ is defined as the volumetric flow rate per membrane area divided by the applied pressure. Membranes with high permeabilities are preferred because smaller pressures, and therefore less energy, are needed to process a given volume. The volumetric flow rate is determined by monitoring the mass of the solution that permeates across the membrane during a period of time. Using a membrane with a known area, the hydraulic permeability can be determined by measuring the volumetric flow rate over a range of applied pressures. In best cases, there should be a linear relationship between the data from these experiments, and the slope of the line should be equal to the hydraulic permeability of the membrane.

The pores in the terpolymer-derived membranes can be cylindrical due to the self-assembly of the novel macromolecules. Therefore, the Hagen-Poiseuille relationship should be valid. As such, comparing the experimental data with predictions by the Hagen-Poiseuille equation can provide insights into the membrane nanostructure and its impact on membrane performance. The narrow pore size distribution of the nanoporous terpolymer membranes can produce superior performance in filtration applications. Solute rejection tests can be conducted to test this hypothesis, and further explore the connection between membrane structure and transport property.

An aspect of these solute rejection experiments is that they should be run in a manner that reflects the intrinsic property of the membrane, and not an experimental artifact such as concentration polarization or an interaction between the probe solutes and the membrane. We accounted for the influence of concentration polarization by running the experiments in a stirred cell. As the membrane rejects solutes, the solutes accumulate on the membrane surface. This higher concentration of solute drives a higher flux of solute across the membrane, and decreases rejection. Therefore, keeping the solution well mixed is necessary to determine accurately the intrinsic ability of a membrane to reject solutes.

The hydrodynamic conditions in a stirred cell have been well-characterized, which allows for the effects of concentration polarization to be accounted for in the experimental design. Poly(ethylene oxide) (PEO) was selected as a model probe solute because its size in solution (i.e., hydrodynamic radius) is well-known. Furthermore, PEO is relatively inert and does not interact with the membrane. PEO is often used as an antifouling coating because of its minimal interactions with the surrounding environment. The membrane can be challenged with a solution containing a PEO molecule of known size, the permeating solution can be collected, and the PEO concentration in the feed and permeate can be determined using total carbon analysis. One can then calculate the amount of PEO rejected by comparing the PEO concentration in the two solutions. PEO molecules of different molecular weight (i.e., hydrodynamic volume) can be rejected by differing amounts depending upon how their hydrodynamic radii compare to the diameter of the pores in the membrane. Theories for hindered transport through small pores can be used to determine the membrane pore size as well as the spread of the pore size distribution. Combining this result with those from liquid flow experiments one will not only be able to experimentally evaluate membrane performance, but we will also gain a better understanding into how the membrane structure influences transport properties by comparing the pore size and pore size distribution determined from transport tests with those found from materials characterization methods.

Example 6. Antifouling Membranes

Another embodiment provides selective antifouling membranes for the high throughput concentration and purification of therapeutic proteins including recombinant proteins and biomolecules.

Synthesis of Triblock Terpolymers

Important to the successful formation of triblock terpolymer membranes is the synthesis of well-controlled and well-designed macromolecules. By rational design of chemical reaction mechanisms and chemical functionality, one can generate triblock terpolymers with readily controllable and highly tunable molecular weights, molecular weight distributions, and chemical compositions. Manipulating these three parameters using controlled polymerization chemistry allows one to tune the domain geometries and membrane porosities in a systematic manner, which is important to the development of valuable structure-property relationships. One aspect of the invention generates the polyisoprene-b-polystyrene-b-poly(N,N-dimethylacrylamide) (PI-PS-PDMA) A-B-C triblock terpolymers, macromolecules where there are 3 segments of unique chemical design along the length of the polymer chain. This can be accomplished through two "living" polymerization mechanisms. Importantly, this A-B-C terpolymer allows for the functionality of the membrane pore walls to be altered through simple chemical treatments after the optimized solid-state nanostructure is secured.

Development of Nanostructure-Property Relationships in Polymeric Membranes

The PI-PS-PDMA macromolecules can readily microphase separate into domains (i.e., pore diameters) with characteristic length scales ranging from less than 1 nm to 100 nm, which is of important utility in the separation of biopharmaceuticals. The size and shape of these domains can be controlled in a facile manner by controlling the molecular weight of each of the constituent moieties. Of importance to the end user will be the proper characterization of the pore sizes and nanostructure. In order to characterize the thin films, one can use atomic force microscopy (AFM) and small angle x-ray scattering (SAXS), as well as transmission electron microscopy (SEM and TEM, respectively). In this way, the complete nanostructure of the resultant membranes can be understood prior to transport measurements. Furthermore, after the thin film has been deposited, the PDMA brush (FIG. 1), which coats the pores of the nanoporous PI-PS matrix, can be converted to poly(acrylic acid) (PAA) by exposing the membrane, in the solid state, to a mild hydrochloric acid solution. Again in the solid state, the carboxylic acid functionalities (FIG. 1) inside the pores can be converted readily to any number of the identified antifouling chemistries (e.g., poly(ethylene oxide), poly(sulfobetaine), and polyglycerol).

Fabrication of Functional, High Performance Membranes

Figure 3:
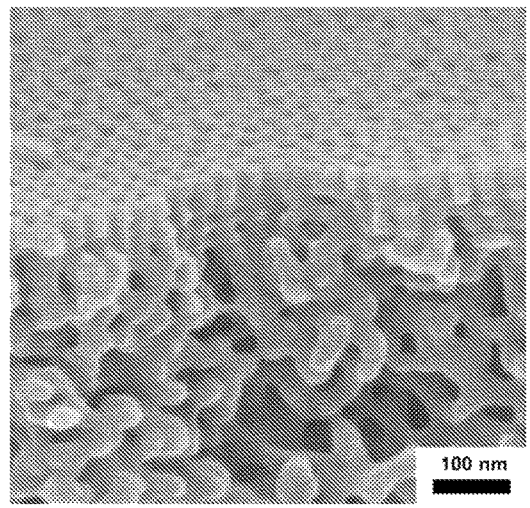
FIG. 3. PRIOR ART. Cross-sectional SEM image of a nanoporous triblock terpolymer membrane fabricated using the casting protocol. The figures is from Phillip, et al., *Nano Letters*, 2011, 11, 2892 and PCT Publication WO2012/151482. Note that at the membrane (the top of the image), the monodisperse pores serve as a thin (~100 nm) selective layer. These pores have an approximate diameter of about 20 nm. However, this membrane lacks the pore wall functionality to be described within (vide infra).

The membrane fabrication process should produce a selective layer, whose structure is templated by the block terpolymer, sitting on top of a microporous support layer. There are three requirements of the casting protocol. First, it must produce a thin selective layer because this layer will provide the dominant resistance to flow. Second, the protocol must control the triblock terpolymer self-assembly in order to create a high density of monodisperse nanopores that are accessible for flow. Finally, the nanopores should quickly open to a layer with larger dimensions (i.e., micropores) in order to facilitate a high flux of solution for increased production streams. As shown in the cross-sectional SEM image of FIG. 3, such a method to generate this optimized membrane structure has been developed for another block copolymer system. The knowledge gained from this system can be extended to the more robust and chemically diverse systems as described herein.

Briefly, the technique, which combines a controlled solvent evaporation step with a subsequent non-solvent induced phase separation step, is a facile, scalable technique. It involves dissolving the terpolymer in a solvent, carefully casting the resulting solution into a thin film, allowing the solvent to evaporate from the film for a period of time, and finally plunging the film into a non-solvent bath to induce phase separation. The non-solvent quench traps the polymer microstructure in a non-equilibrium state and gives rise to the tapered pores observed in FIG. 3 (See International Publication WO2012/151482, the contents of which are incorporated herein by reference in its entirety). This combination of highly selective pores combined with the tapered nanostructure is a difference between this invention and previous membranes fabricated from block copolymers.

A correlation between the membrane nanostructure and its transport characteristics allows for the optimization of the ultimate performance of the biomedical devices. Two key transport properties, hydraulic permeability and selectivity, depend on the nanostructure, and are the focus of the following evaluation. Permeability is a measure of how rapidly material can pass through the membrane. Selectivity is a measure of how well a membrane can distinguish between two different species. The high density of nanopores and their quickly tapering morphology allows for high permeabilities, while the narrow pore size distribution results in highly selective membranes. One can use a combination of water flow and solute rejection tests to assess these membrane properties.

Polyethylene glycol, a molecule that does not interact with the membrane surface, can be used to study the influence of pore structure on membrane selectivity. Additionally, membrane fouling (i.e., the adhesion of solutes to the membrane surface during operation) can dramatically affect selectivity and diminish process performance. For example, albumin is an impurity that must be removed during the purification of several clinically-relevant antibodies (e.g., infliximab and rituximab) because it is known to foul membranes. Albumin can be used to study the influence of fouling on membrane selectivity. Furthermore, the easily-tailored pore chemistry described herein allows one to study the effects of surface chemistry on membrane fouling. In this way, clear structure-property relationships can be developed and serve as new inputs in the future design of functional macromolecules and optimization of the biomedical membrane system in order to make a clear clinical impact.

Therefore, the development of membrane processes that have met the evolving needs of the biotechnology industry has led to their increased implementation. Today membrane systems are the primary method of choice for concentration (via ultrafiltration) and buffer exchange (via diafiltration) in the production of protein therapeutics. However, these systems are not without their shortcomings.

Figure 4:
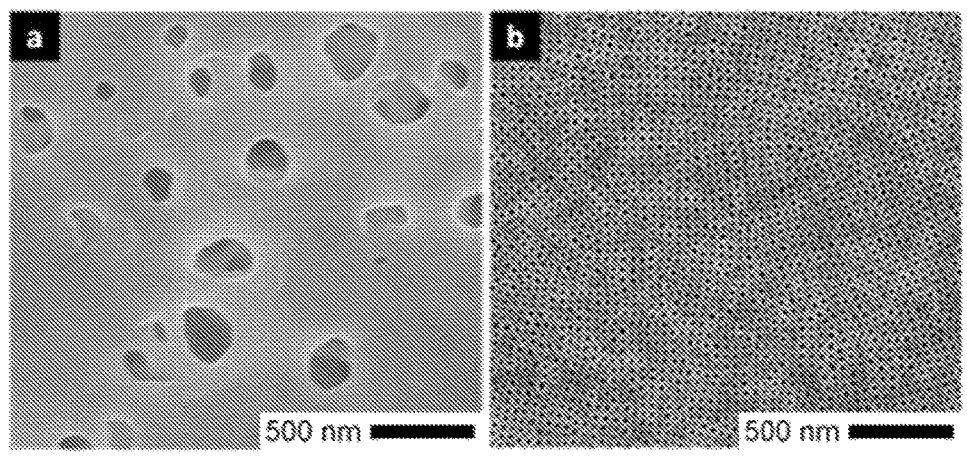
FIG. 4. PRIOR ART. SEM micrographs of (a) the commercially-available ultrafiltration membrane made using phase inversion techniques and (b) a membrane formed by the self-assembly of triblock terpolymers. Note that the pore size shown in FIG. 4b is ~50 nm; this is an order of magnitude larger than those generated according to embodiments described herein. The figure is from Phillip, et al., *Nano Letters*, 2011, 11, 2892.

In particular, current commercial membranes are made using phase separation techniques that result in membrane structures containing wide distributions of pore sizes (FIG. 4a, from Phillip et. al, *Nano Letters*, 2011, 11, 2892).

Therefore, to ensure product quality and prevent the loss of valuable product, membranes with smaller nominal pores sizes and low pore densities are employed. This reduces the membrane permeability, increases filtration times, and creates bottlenecks within the process. Achievement of higher production levels of monoclonal antibodies requires that these bottlenecks be eliminated. However, further optimization of traditional phase separation membranes (FIG. 4a) to help circumvent these bottlenecks is unlikely. Empirical evidence suggests that continuing to use the standard phase separation methods to develop filtration membranes will not lead to more permeable membranes without sacrificing selectivity. Therefore, we have described herein a new membrane paradigm in order to advance biotechnology processing.

Example 7. Tunable Membranes

Another embodiment of the invention provides tunable nanoporous membranes with chemically-tailored pore walls from triblock terpolymer templates. Membranes which are derived from self-assembled block polymers have shown promise as highly selective and highly permeable filters, but the complex synthetic routes and limited pore functionalities of existing systems need to be improved if these materials are going to serve as a platform for the next generation of nanostructured membranes.

Here, we describe the facile synthesis of a polyisoprene-b-polystyrene-b-poly(N,N-dimethylacrylamide) (PI-PS-PDMA) triblock terpolymer using a controlled reversible addition-fragmentation chain transfer (RAFT) polymerization mechanism. This material is then processed into a membrane using a self-assembly and non-solvent induced phase separation (SNIPS) technique, which creates an asymmetric, porous structure consisting of a selective layer that contains a high density of PDMA-lined pores ($9.4 \times 10^{13}$ pores $m^{-2}$) with an average diameter of 8.1 nm, as determined using solute rejection tests. Solvent flow experiments demonstrate that the PI-PS-PDMA membrane has a pH-independent permeability of 6 L $m^{-2}$ $h^{-1}$ $bar^{-1}$.

The PDMA moiety lining the pore walls is converted, through simple hydrolysis in the solid state, to yield a poly(acrylic acid)-lined (PAA-lined) structure. The permeability of the PI-PS-PAA membrane is pH-dependent, and ranges from 0.6 L $m^{-2}$ $h^{-1}$ $bar^{-1}$ for solutions with a pH greater than 4 to 16 L $m^{-2}$ $h^{-1}$ $bar^{-1}$ for a solution at pH 1. Solute rejection tests demonstrated a pore size of 2.6 nm for the PI-PS-PAA membrane. The facile synthesis of the PI-PS-PDMA material, the scalable SNIPS membrane fabrication protocol, and the simple conversion chemistry of the pore functionality demonstrate that these nanostructured membranes are a strong platform for applications within the range of water purification, pharmaceutical separations, sensors, and drug delivery.

Here, we describe the facile synthesis of a polyisoprene-b-polystyrene-b-poly(N,N-dimethylacrylamide) (PI-PS-PDMA) triblock terpolymer using a controlled reversible addition-fragmentation chain transfer (RAFT) polymerization mechanism. Subsequently, the PI-PS-PDMA is cast into a functional membrane with an ordered, yet asymmetric, nanostructure using a self-assembly and non-solvent induced phase separation process. The particular triblock terpolymer is selected because the combination of the PI and PS domains provide mechanical integrity to the membrane, while the PDMA domain allows for the pore walls of the membrane to have specific, and easily-tailored, chemical functionality. The asymmetric structure of the tapered nanoporous thin film allows for a sharp molecular weight cut-off (MWCO), while retaining a relatively high flux.

The PDMA moiety of the terpolymer lines the pore walls of the membrane, and we have demonstrated that it can be converted, through simple hydrolysis in the solid state, to yield a poly(acrylic acid)-lined (PAA-lined) structure. The acrylic acid functionality has been shown to be a robust platform to add any number of chemistries to the membrane walls. The RAFT polymerization procedure allows for the straightforward synthesis of large quantities of well-defined triblock terpolymer. The combination of these inventive features enable these membranes to be used as a readily-fabricated platform for high flux, high performance nanoscale applications.

Example 8. Synthesis of PI-PS-PDMA

Controlled radical (e.g., RAFT) polymerization enables any existing free radical polymerization, which dominates the current polymer synthesis marketplace, to be retrofitted for the facile synthesis of block polymers by the simple addition of a RAFT (or any other living free radical controlling) agent. For this reason, the PI-PS-PDMA triblock terpolymer used in this work was synthesized using a RAFT-mediated polymerization mechanism (Scheme 1).

Scheme 1. Synthesis of the polyisoprene-b-polystyrene-b-poly(N,N-dimethylacrylamide) (PI-PS-PDMA) triblock terpolymer.

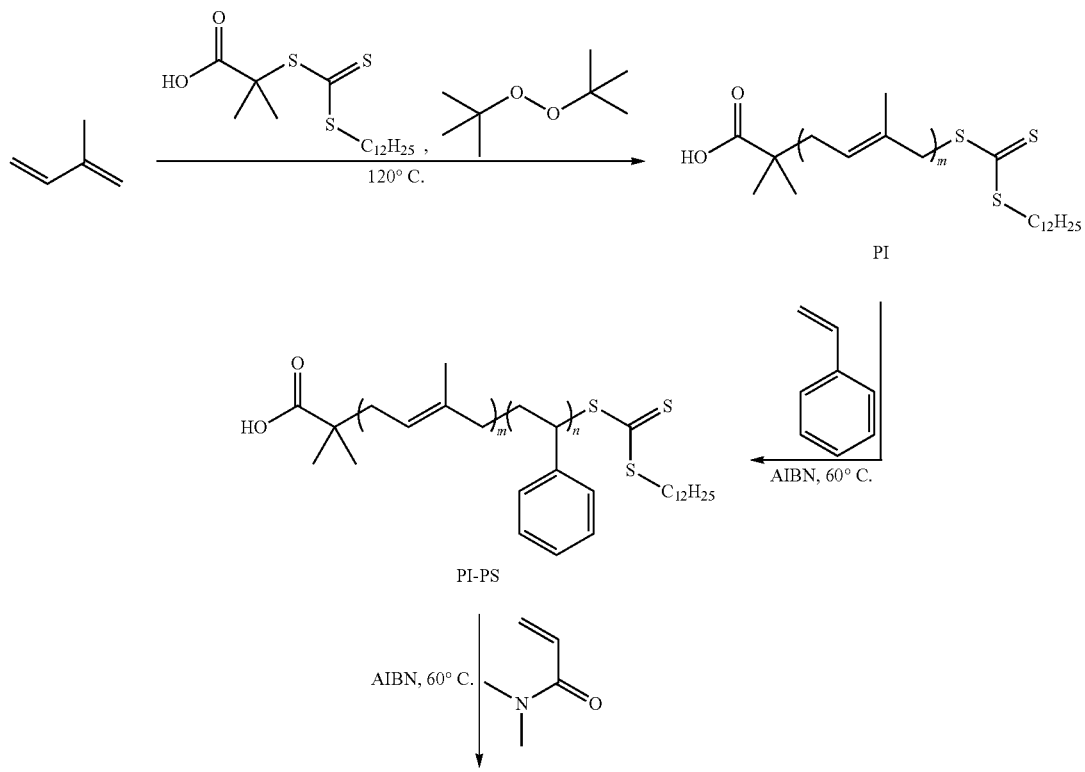

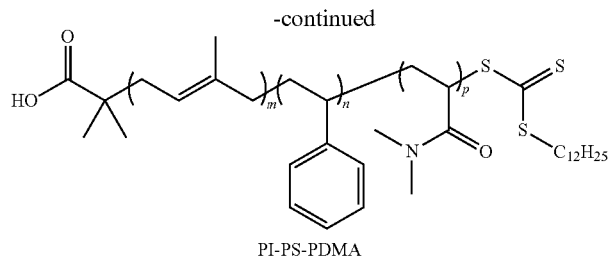

PI-PS-PDMA

Figure 5:
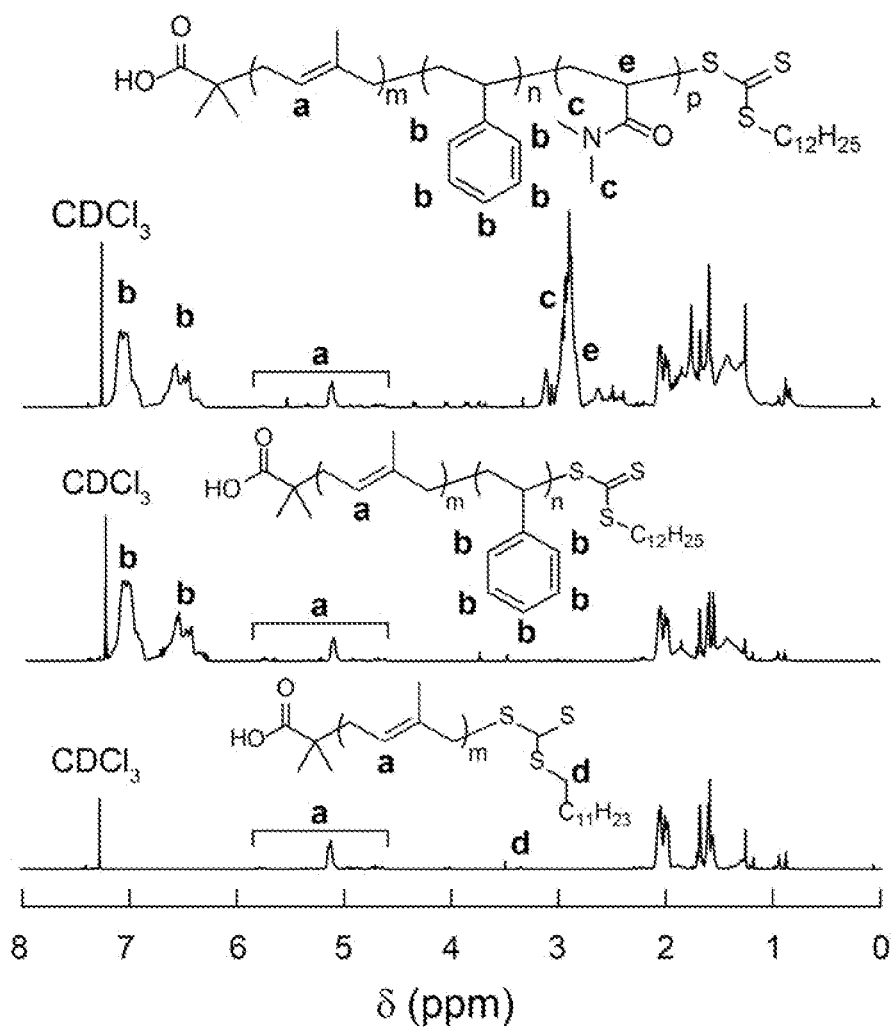
FIG. 5. $^1$H NMR spectra of the PI (lower) and PI-PS (middle) precursors and the PI-PS-PDMA triblock terpolymer (upper). Characteristic peaks from each moiety are labeled to highlight the relative composition the terpolymer.
Figure 6:
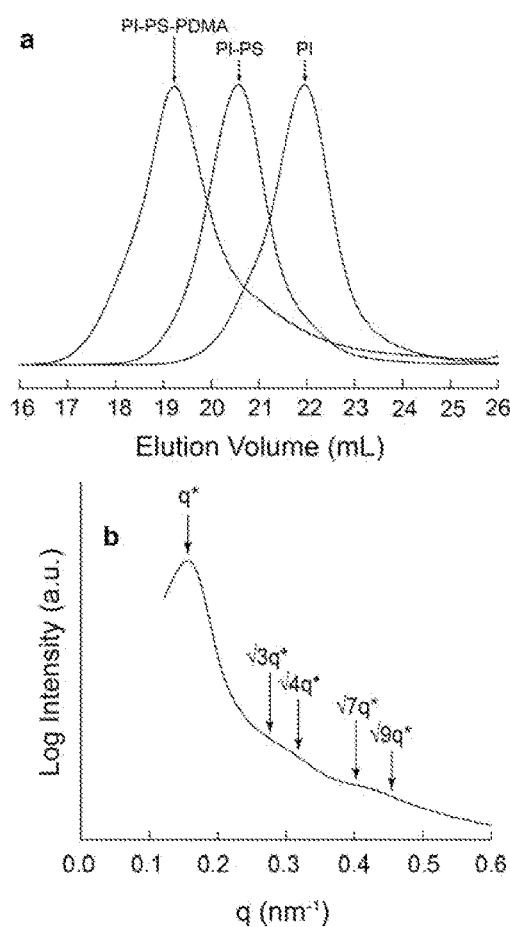
FIG. 6. (a) SEC traces of the triblock terpolymer series with THF as the mobile phase at a flow rate of 1 mL min-1. The clean shift (i.e., no trailing or coupling signals) indicates the ability of the PI homopolymer and the PI-PS diblock copolymer to serve as macroinitiating agents for the synthesis of the PI-PS-PDMA triblock terpolymer. (b) Small-angle x-ray scattering (SAXS) data of the bulk PI-PS-PDMA powder. The principle reflection (q*=0.151 nm-1) indicates a solid state domain spacing of ~42 nm. The listed reflections suggest a hexagonally-packed structure for the PI-PS-PDMA powder in the solid state.

A combination of $^1$H NMR spectroscopy and size exclusion chromatography (SEC) indicated the synthesis of a relatively low dispersity, high molecular weight triblock terpolymer. The PI, PS, and PDMA blocks had $^1$H NMR-determined molecular weights of 14.2 kDa, 31.1 kDa and 23.3 kDa, respectively (FIG. 5). This corresponds to a volume fraction of 24%, 46% and 30%, respectively (based on the following values of the homopolymer densities at 25° C.: $\rho_{PI}$=0.92 g cm$^{-3}$, $\rho_{PS}$=1.06 g cm$^{-3}$, and $\rho_{PDMA}$=1.21 g cm$^{-3}$). The terpolymer had a dispersity (Đ) value of 1.3, based on polystyrene standards (FIG. 6a).

The specific triblock terpolymer composition was targeted because prior work that used self-assembled block polymers as templates for the nanostructure of porous membranes suggested that a hexagonally close-packed (HCP) geometry in the powder state is conducive to the formation of high quality membranes. SAXS analyses of the pressed powder PI-PS-PDMA sample were consistent with the HCP morphology with peaks shown at 1, √3, √4, √7 and √9 multiples of the principal reflection, q* (FIG. 6b).

Figure 7:
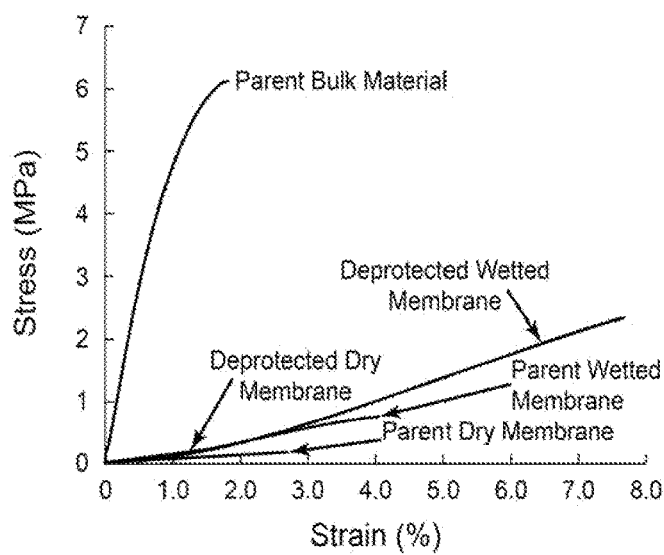
FIG. 7. Stress-strain curves of the cast membranes. The parent bulk material, composed of PI-PS-PDMA, has a toughness of 67 kJ m-3. The parent membrane, has a toughness in the dry state of 2.4 kJ m-3 and 17 kJ m-3 in the wetted state. The functionalized membrane, composed of PI-PS-PAA, had toughness values of 1.7 kJ m-3 and 96 kJ m-3 in the dry and wetted states, respectively. The significant increase in toughness of the membranes in the wetted state may be attributed to the serendipitous feature of crosslinking of PI domains in the presence of strong acids for prolonged periods at elevated temperatures while converting from PDMA to PAA.

The triblock terpolymer, PI-PS-PDMA, was synthesized instead of a diblock copolymer analog, PS-PDMA, because incorporating the rubbery, low $T_g$ PI block improves the mechanical response of the ultimate membrane. Tensile testing conducted using the bulk PI-PS-PDMA material (FIG. 7) supports this hypothesis. Specifically, the mechanical toughness of the PI-PS-PDMA sample is consistent with the toughness of PI-PS-P4VP terpolymers studied in prior work that demonstrated the advantages of moving from diblock to multiblock systems when fabricating nanostructured porous materials.

Figure 8:
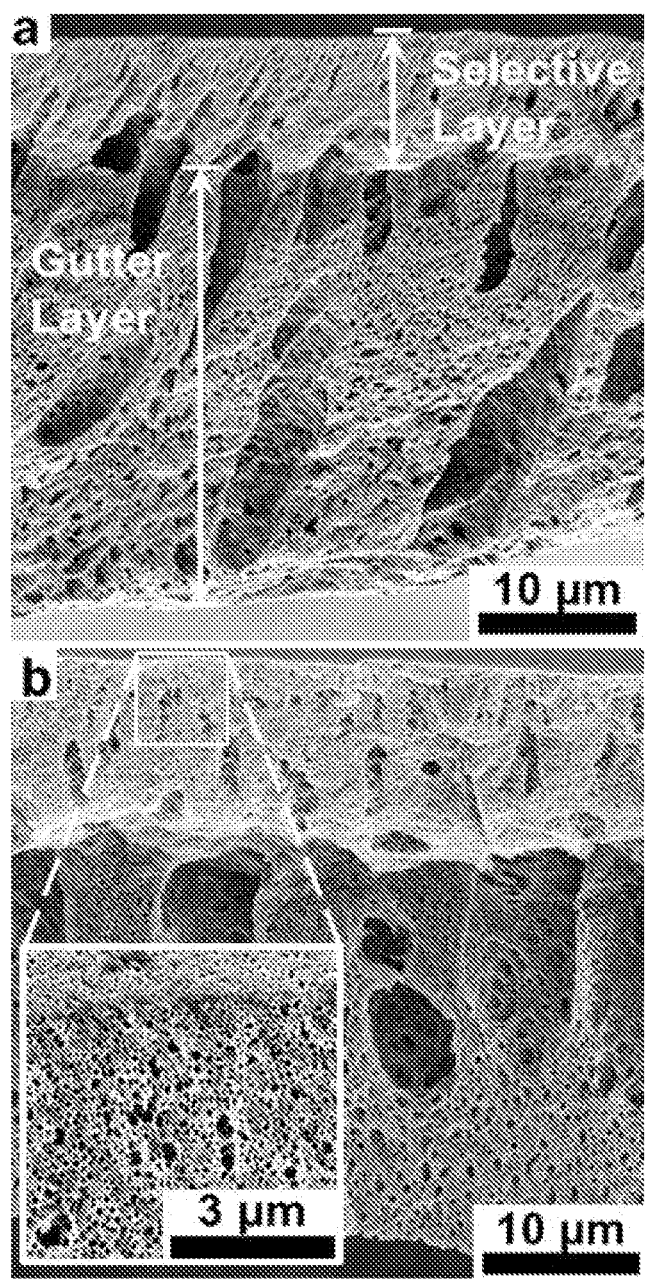
FIG. 8. Cross-sectional SEM micrographs of the terpolymer membranes. The asymmetric structure of the (a) parent PI-PS-PDMA and (b) deprotected PI-PS-PAA membranes consist of a selective layer and a gutter layer, which contains microscopic voids. In the inset of (b), a higher magnification micrograph of the PI-PS-PAA top-surface-cross-section interface shows the structure of the ~10 μm active layer as it opens into the microporous support layer.

Asymmetric membranes were fabricated from the PI-PS-PDMA terpolymer using the SNIPS technique. Briefly, the terpolymer was dissolved at a concentration of 15% (by weight) in a mixed solvent, which consisted of dioxane and tetrahydrofuran combined at a 7/3 (w/w) ratio. The resulting solution was drawn into a thin film and solvent was allowed to evaporate for 75 s. Then, the thin film was plunged into a DI water bath to fix the membrane structure in place. The anisotropic structures of the membranes produced by the SNIPS method are displayed in the cross-sectional SEM micrographs shown in FIG. 8. These micrographs indicate that the total membrane thickness (~40-50 μm) consists of two sections, a denser top (selective) layer and a more porous underlying (gutter) layer.

Figure 9:
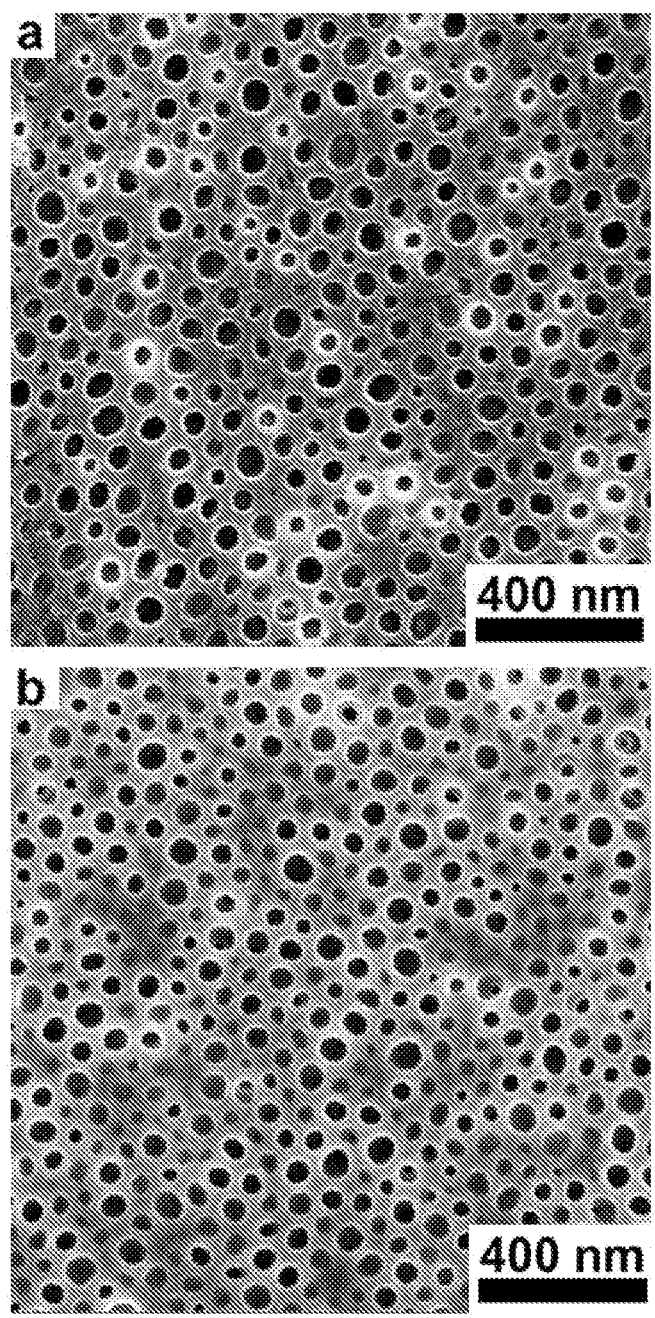
FIG. 9. SEM micrographs of the top surface of the terpolymer-derived membranes. (a) The active layer surface of the PI-PS-PDMA parent membrane that was cast from a 15% (by weight) polymer solution in a 70/30 (w/w) mixture of dioxane and tetrahydrofuran as solvent with a 75 s evaporation time. (b) The active layer surface of a converted PI-PS-PAA membrane. This membrane is produced by soaking a parent membrane in a 6 M hydrochloric acid solution for 48 hours at 85° C. The structural features of both surfaces are approximately the same despite the chemical treatment used.

The ~10-micrometer-thick dense layer is situated at the top of the micrograph, which corresponds to the surface of the membrane that was exposed to the atmosphere during solvent evaporation. The terpolymer concentration in this region increases significantly during the evaporation step causing the terpolymer to self-assemble and template the nanostructure of the membrane in this upper region. A micrograph of the top surface of the parent membrane shows an average of 9.4×10$^{13}$ pores m$^{-2}$ with an average pore diameter of 53 nm and a standard deviation of 20 nm (FIG. 9a). Below the dense layer, the membrane quickly opens into macrovoids that are characteristic of membranes formed via phase inversion, rather than terpolymer self-assembly. Due to the relatively large sizes of these voids, this underlying layer provides minimal resistance to flow while providing mechanical support to the selective layer, which increases the durability of the membrane.

Hydraulic Permeability

Figure 10:
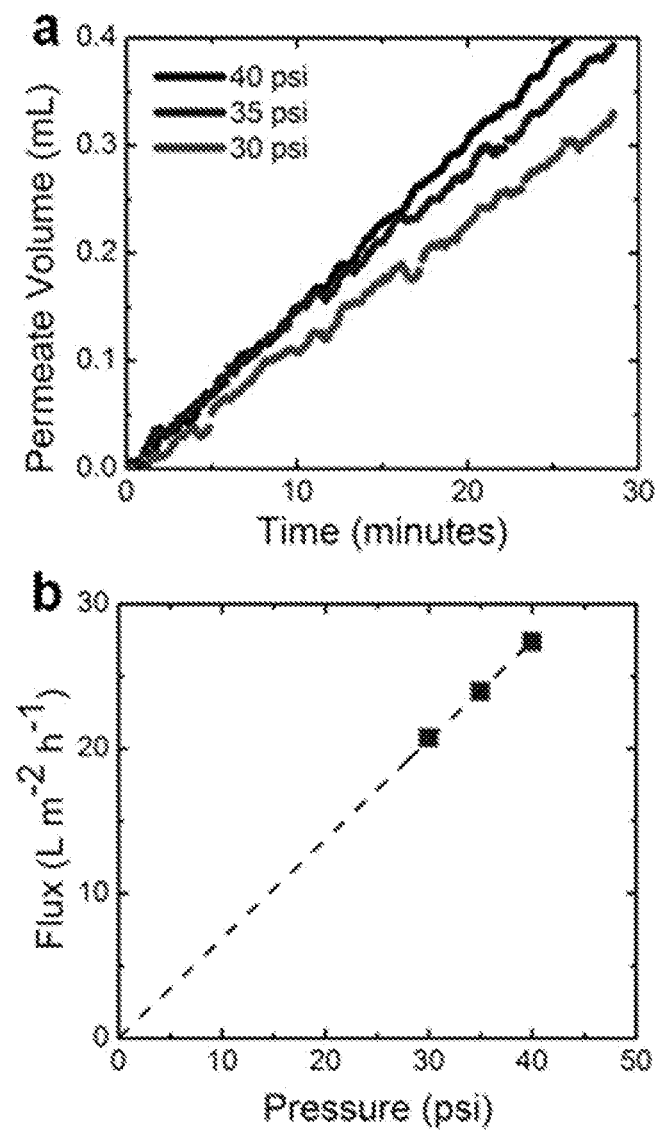
FIG. 10. Sample data from stirred cell transport tests on the PI-PS-PAA membrane with a feed solution at pH 4.2. The volume of the collected permeate is plotted as a function of time (a) at various applied pressures where the upper line corresponds to 40 psi, the middle line corresponds to 35 psi and the lower line corresponds to 30 psi. The slopes of these lines are used to calculate the fluxes across the membrane, which are plotted against applied pressure in (b). The slope of the line in (b) yields a permeability of 0.657 L m$^{-2}$ h$^{-1}$ psi$^{-1}$.

The hydraulic permeability of the parent membrane was determined by measuring the water flux at applied pressures ranging from 5 to 40 psi. They withstood repeated operation at an applied pressure of 40 psi easily. Furthermore, in practical application these membranes will be cast on a microporous support to help improve their mechanical stability. The water flux vs. applied pressure data were fit with a linear equation, whose slope is equal to the hydraulic permeability (FIG. 10).

Figure 11:
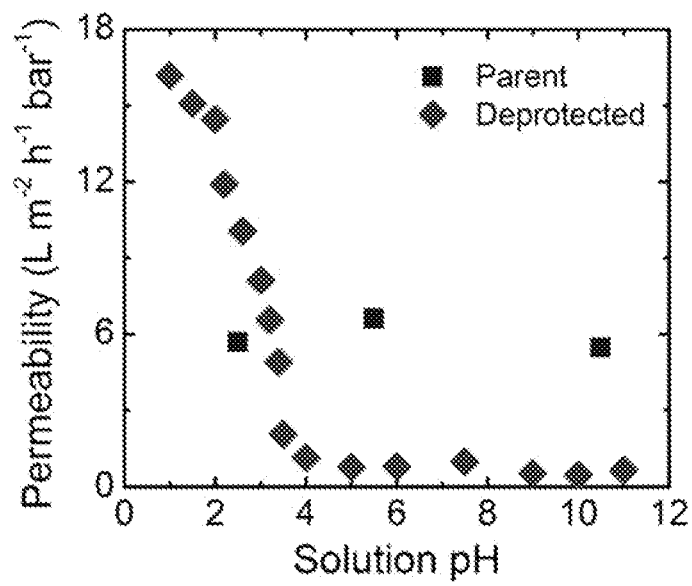
FIG. 11. Hydraulic permeabilities of the parent and deprotected (i.e., PAA-functionalized) terpolymer membranes plotted vs. solution pH. For pH values ranging from 2-11, the parent membrane had a constant hydraulic permeability of 6 L m$^{-2}$ h$^{-1}$ bar$^{-1}$. The PI-PS-PAA membrane had a permeability of 0.6 L m$^{-2}$ h$^{-1}$ bar$^{-1}$ from pH 4-12. Below pH 4, the permeability of the PI-PS-PAA membrane increased monotonically; reaching a permeability of 16 L m$^{-2}$ h$^{-1}$ bar$^{-1}$ at pH 1.

In FIG. 11, the squares represent the hydraulic permeability of the parent membrane for feed solutions of pH 2.5, 5.5, and 10.5. Over this pH range, the hydraulic permeability of the parent membrane was constant at a value of ~6 L m$^{-2}$ h$^{-1}$ bar$^{-1}$. This indicates that the PDMA groups (pKa=7.3) lining the pore walls are not affected by the pH of the solution.

Molecular weight cutoff tests were performed on the parent membrane to probe its ability to reject molecules based on differences in solute size. In these experiments, the membrane was challenged with solutions containing PEO molecules ranging in molecular weight from 1.1 to 10 kDa. Using literature data for the intrinsic viscosity and diffusion coefficients of PEO, the hydrodynamic radii were calculated to range from 0.75 to 3.0 nm.

Percent Rejection

Percent rejection values were calculated by comparing the concentration of PEO in the solution that permeated the membrane to the concentration of PEO in the initial feed solution. The results of the solute rejection experiments are represented by the squares in FIG. 12; a MWCO curve (i.e., solute rejection plotted against molecular weight) is provided in FIG. 13. During these experiments, the feed solutions were stirred at 400 rpm to produce mass transfer coefficients, k, on the order of 1.0×10$^{-5}$ m s$^{-1}$, while the water flux, $J_w$, during the MWCO tests was equal to 7.9×10$^{-7}$ m s$^{-1}$. Because this results in a $J_w$/k value around 0.13, which is significantly lower than the suggested limit where concentration polarization becomes severe, the presented results are solely a function of the ability of the terpolymer membrane to separate solutes based on size.

For the parent membrane, solutes with a hydrodynamic radius greater than 2.2 nm, (i.e., the 6.0 kDa PEO molecule) were almost completely rejected. Molecules with hydrodynamic radii smaller than 1.2 nm (i.e., the 2.1 kDa PEO sample) permeate through the membrane with little (~4%)

rejection. The 4.0 kDa PEO sample, which has a hydrodynamic radius equal to 1.7 nm, was only partially rejected (60% rejection). This point of datum, in conjunction with established theories for size-selective separations, was used to estimate the pore size of the parent membrane at 8.1 nm in diameter.

Figure 14:
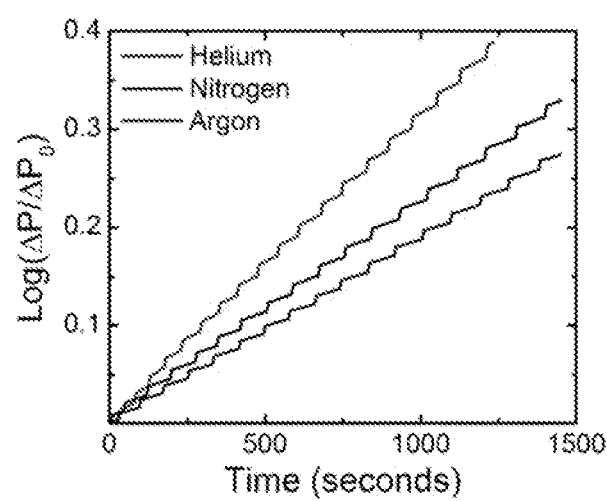
FIG. 14. Gas diaphragm cell experiments were used to determine the permeability of the parent terpolymer membrane in the dry state. The membrane was placed between gas cylinders at high (~12 psig) and low (~0 psig) pressures, and the pressure change was recorded as a function of time. The logarithm of the ratio of the changing pressure difference to the initial difference yields is linear with time. The slope is used to determine the permeability for the three gases shown above, which suggest average pore sizes in the range of 50 to 80 nm through the active layer of the membrane. The upper line corresponds to helium, the middle line corresponds to nitrogen and the lower line corresponds to argon.

It is noted that there is disagreement in the reported pore size of the parent membrane between that calculated from MWCO data (8.1 nm) in the wetted state and that observed in SEM micrographs (53 nm) in the dried state (FIG. 14). This may be attributed to the swelling of the PDMA domains in a wetted environment. The average number of repeat units in a linear PDMA block with molecular weight of 23.3 kDa can be approximated as NPDMA=235. In the upper limit that the chains are fully extended with a carbon-carbon bond length (l) of 1.4 Å, the PDMA chain length as a rigid rod (i.e., neglecting any geometrical constraints associated with bond angles) $L_{PDMA}=2 \times Nl$ would be 65.8 nm. Therefore, the pore would be closed completely if the chains were extended fully (131.6 nm) from both sides of the pore. However, due to the balance between the enthalpy of solvent-repeat unit mixing and the entropy associated with chain stretching, it is known that the length of moderate-density, surface-grafted polymer brush chains will scale as N0.6, if the polymer brush is in a good solvent.

Gas Diaphragm Study

This scaling behavior changes when the polymer brush is confined to a nanoscale cylinder. Specifically, computational models predict that, for relatively large polymers in the moderate brush density regime, the size of the polymer brush will scale with N0.8 in a good solvent. Using the scaling from computations, the extended PDMA brush within the pore would be ~22 nm long. Therefore, the effective pore diameter for the membrane in the wetted state (i.e., the pore size calculated from MWCO tests) would be 44 nm smaller relative to the dry state [i.e., the pore size determined using the SEM images and supported by gas diaphragm cell experiments (FIG. 14)]. This would lead to an effective pore diameter in the wetted state of ~9 nm, which agrees well with the transport test studies, especially given the simple nature of the scaling analysis.

Wetted State Study

Figure 15:
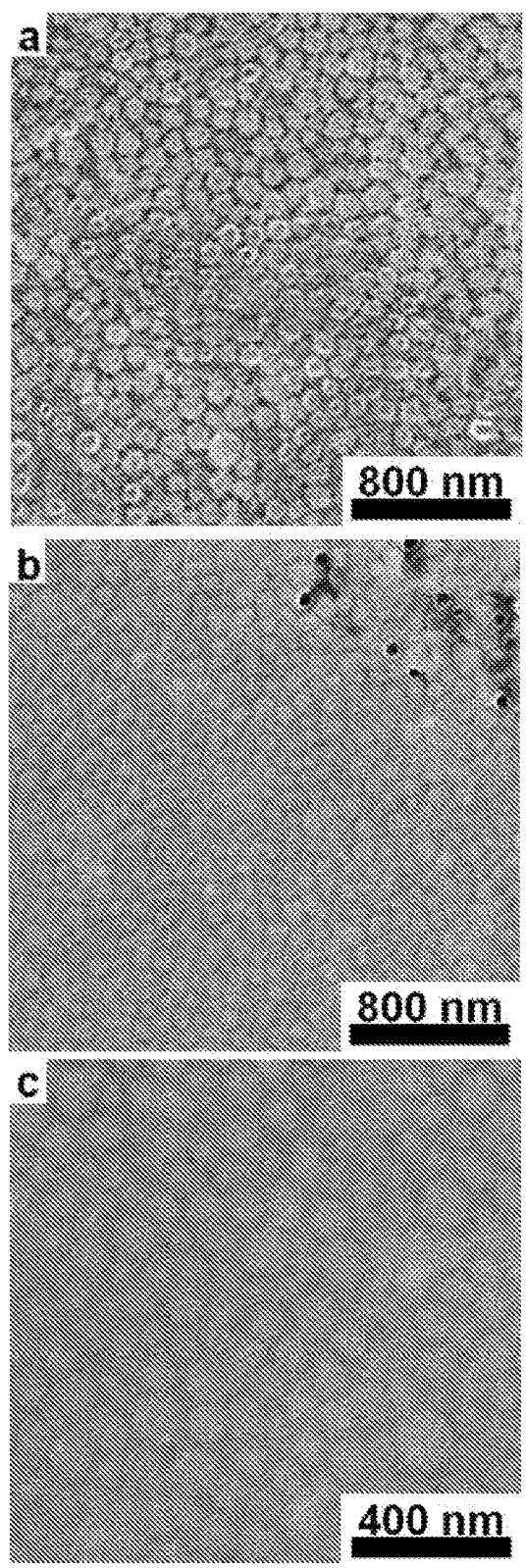
FIG. 15. SEM micrographs of terpolymer membranes wet with the ionic liquid 1,3-dimethylimidazolium bis(trifluoromethyl)sulfonylamide ([mmim][Tf2N]). (a) The top surface of the PI-PS-PDMA membrane contains a combination of open pores and mushroom-like structures due to the swelling of the PDMA chains in [mmim] [Tf2N]. (b) Pores are not visible on the top surface of the PI-PS-PAA due to the swelling of the PAA chains in [mmim] [Tf2N]. (c) A higher magnification micrograph of the top surface of the PI-PS-PAA membranes.

In order to probe this hypothesis experimentally, the structure of the PI-PS-PDMA membrane was characterized in the solvated state by wetting the pores of the membrane with the hydrophilic ionic liquid, 1,3-dimethylimidazolium bis(trifluoromethyl)sulfonylimide ([mmim] [Tf2N]). Because the vapor pressure of [mmim] [Tf2N] approaches zero, its evaporation rate in the vacuum environment of the SEM is negligible, which enables the conformation of solvated PDMA brushes to be observed using electron microscopy. In the solvated state, the PDMA brushes extend toward the center of the pore reducing the effective pore diameter (FIG. 15). In some cases, it appears that the extended PDMA chains span the pore width and form mushroom-like structures. This extension of the PDMA brushes into the pores of the membrane also provides a rationalization for the very sharp MWCO reported in FIG. 12 despite the spread in pore sizes observed in FIG. 9.

While the tight molecular weight cutoff of the PI-PS-PDMA-based membrane is useful, the conversion of the pore walls to a specific functionality will be of utility in the production of fouling-resistant and/or chemically selective membranes. Specifically, based on the relative quality of the casting solvents for the three blocks of the terpolymer and the difference in pore size determined between the dry and wet states, we hypothesize that the parent membrane contains PDMA-lined nanopores that provide the ability to tailor the chemical functionally of the membrane post fabrication. Taking advantage of this useful property requires the conversion of the PDMA block to the carboxylic acid derivative, poly(acrylic acid) (PAA); previously, it has been shown that PAA can be used as a versatile platform for functional group conversion to a variety of different moieties.

Conversion of PDMA to PAA: Functionalization

The conversion of the PDMA moiety to PAA was performed via submersion of the parent membrane in an aqueous 6 M HCl solution. No appreciable conversion of PDMA to PAA was observed at temperatures below 60° C.; however, a high degree of conversion was observed at a solution temperature of 85° C., in agreement with previous reports.

Figure 16:
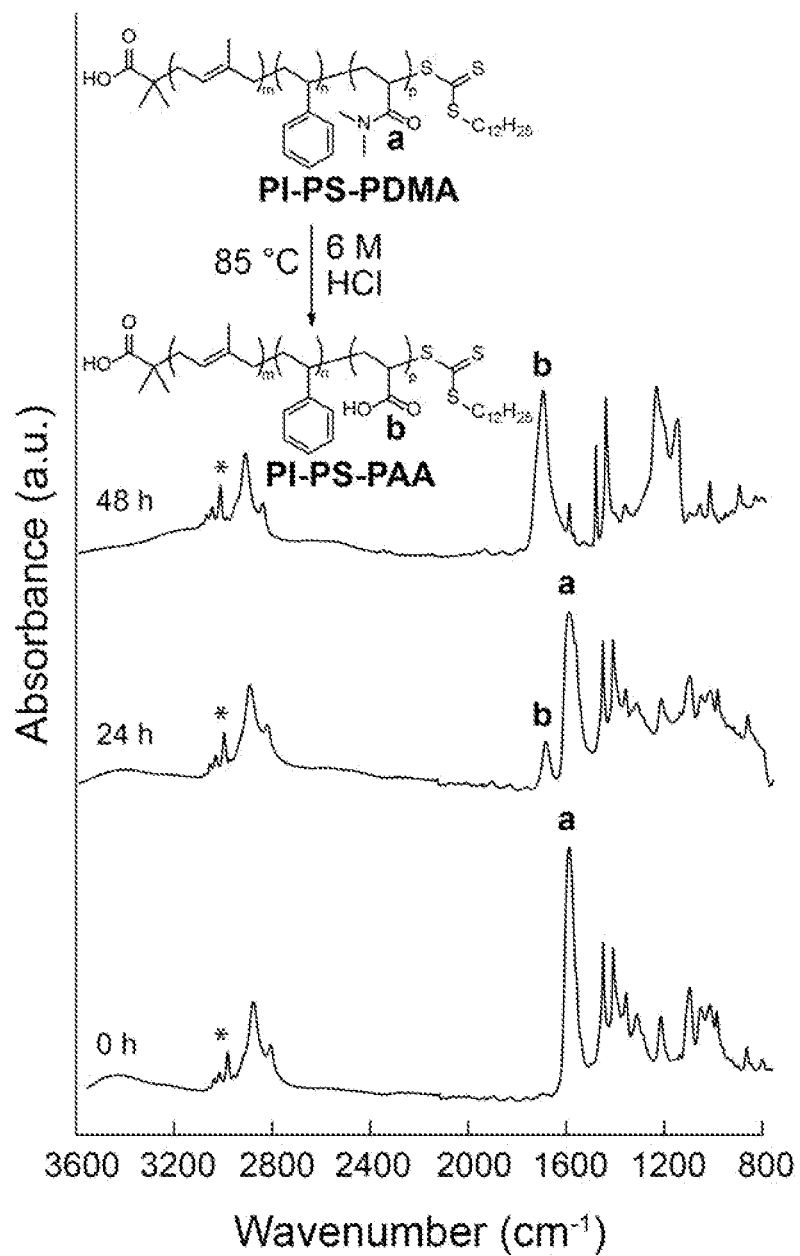
FIG. 16. ATR-FTIR monitoring the conversion of the pore walls from PDMA to PAA by suspension of the cast membrane in a 6 M HCl solution at 85° C. as a function of time. The signal at 1600 cm⁻¹ corresponds to the characteristic carbonyl stretch from the PDMA peak labeled (a), while the absorption at ~1700 cm⁻¹ corresponds to characteristic carbonyl stretch from PAA peak labeled (b). As shown in the uppermost spectrum, peak a deceases with time as PDMA is converted to PAA, where the reaction nears full conversion at a reaction time of 48 h. The relative intensities are standardized using the characteristic aromatic C—H stretches labeled (*) of the un-reactive polystyrene domain between 3100-3000 cm⁻¹.

Deprotection of the poly(N,N-dimethylacrylamide) groups to poly(acrylic acid) groups (PAA) was monitored by the decreasing intensity of the characteristic carbonyl stretch from the PDMA peak (labeled a in FIG. 16) and the simultaneous increase in the characteristic carbonyl stretch from PAA peak (labeled b in FIG. 16). The disappearance of the characteristic carbonyl stretch from the PDMA demonstrates the complete conversion of the DMA group occurs after 48 hours of exposure (FIG. 16).

Figure 17:
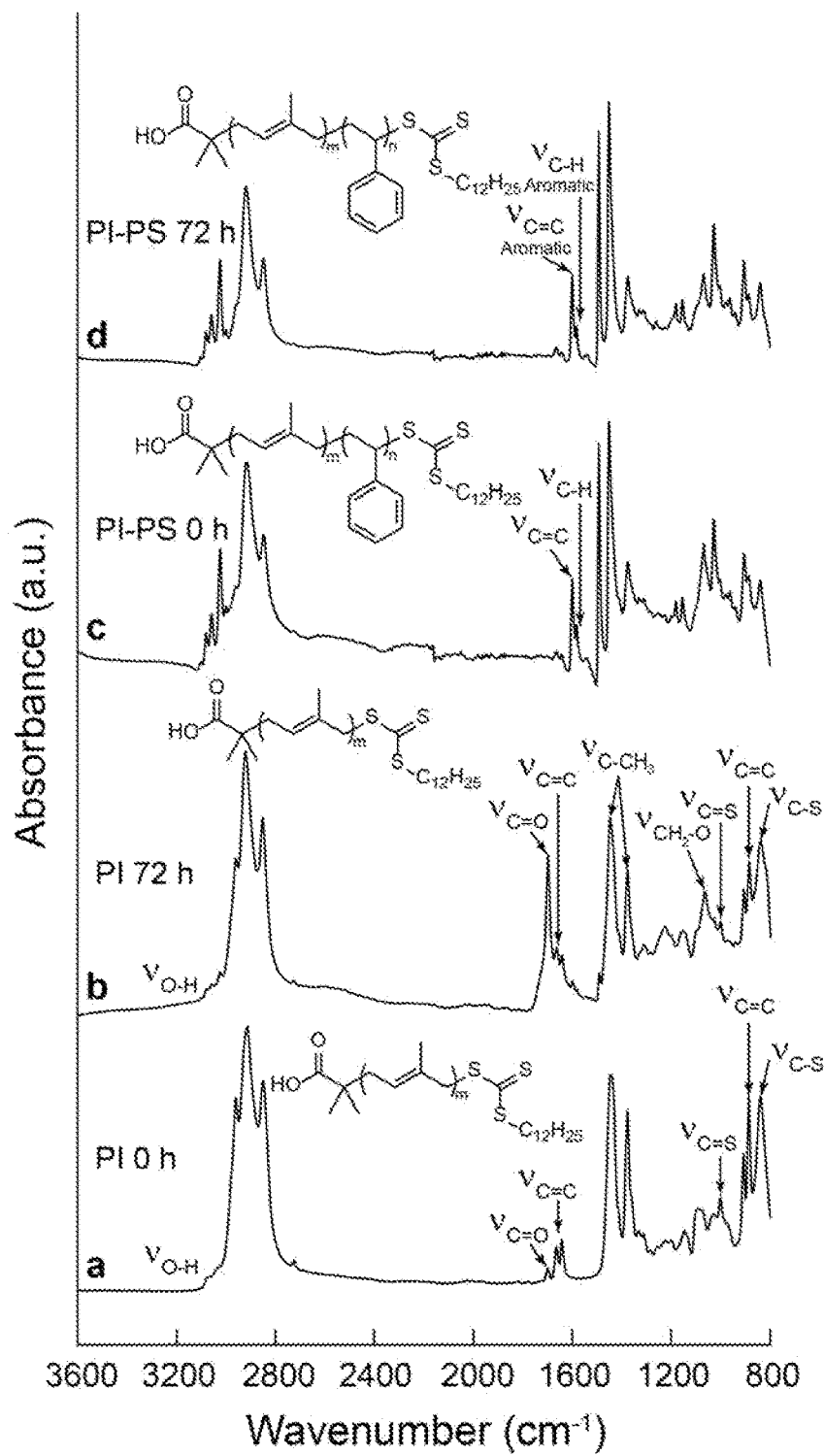
FIG. 17. ATR-FTIR spectra of a PI homopolymer (a) before and (b) after suspension of the solid in 6 M HCl solution at 85° C. for 72 hours. Analogous data are shown (c) before and (d) after suspension of the PI-PS diblock copolymer using the same reaction conditions. During the reaction of the PI analog in (a) and (b), a small qualitative decrease in the $v_{C-S}$ and $v_{C-S}$ stretches and the increase in the $v_{CH2-O}$, $v_{C-O}$, $v_{C=O}$, and $v_{O-H}$ stretches between (a) and (b) indicates partial oxidation of the RAFT terminus as well as a small hydroxylation of the alkene bonds in the PI block domain. Using the same reaction conditions of 6 M HCl solution at 85° C. for 72 hours for the PI-PS diblock analog in (c) and (d), little difference in the aforementioned peaks are detected in the hydroxylation of the PI domain indicating limited degradation of the PI-PS support.

Additionally, qualitative assignment of the ATR-FTIR peaks (FIG. 17) indicates that no discernible degradation of the PI or PS domain occurred during the deprotection stage. This is supported by mechanical testing of the PDMA-functionalized and PAA-functionalized membranes (FIG. 7), which demonstrates that the toughness of the PAA-functionalized membrane is slightly larger than that of the PDMA-functionalized membrane. This increase in toughness may be attributed to crosslinking within the PI domains that occurs when the membrane is exposed to a strong acid at elevated temperatures while converting from PDMA to PAA.

FIGS. 8b and 9b show SEM micrographs of the membrane cross-section and top surface, respectively, following the exposure to 6 M HCl at an elevated temperature for 48 hrs. In the dried state, the structure of this converted membrane has the same characteristic features as that of the parent membrane. Furthermore, the porosity, average pore size, and pore density on the surface of the PAA-lined membrane were estimated, and their values were found to be within 4% of the values reported for the parent membrane. When the PAA brushes that line the pore wall are solvated by [mmim] [Tf2N] (FIG. 15b), no pores are visible on the top surface of the PI-PS-PAA membrane. The data above demonstrate that the PDMA block has been converted to the PAA block in the solid state successfully and the nanostructure of the asymmetric terpolymer membrane in the dry state is not altered significantly by the deprotection protocol.

Hydraulic Permeability: pH Study

Following the conversion to PAA, the hydraulic permeability of the membrane was determined over a pH range between 1 and 12. These data are represented by the diamonds in FIG. 11. The permeability of the membrane remained low (~0.6 L m$^{-2}$ h$^{-1}$ bar$^{-1}$) as the pH of the feed solution was decreased from pH 12.0 down to 4.0. At pH 3.5, there was a sharp increase in permeability. As the pH was decreased further, the permeability continued to increase and exceeded that of the parent membrane around pH 3.0. The permeability did not plateau with further decreases in pH, and the maximum determined permeability was over 16 L m-2 h-1 bar-1 at a pH of 1.0, which is comparable to high flux commercial nanofiltration and moderate flux commercial ultrafiltration membranes.

The dependence of the permeability on pH is due to the extension and contraction of the PAA chains lining the walls of the pores in the membrane. At high pH, the deprotonated PAA is negatively charged, which causes the PAA chains to extend into the open pores. Because the deprotonated PAA chains contain negative charges that repel each other, the PAA brushes extend farther into the pores of the membrane than the neutrally-charged PDMA brushes of the parent membrane, which results in a lower permeability. As the solutions tested become more acidic, and pH decreases, the PAA is protonated. The neutrally-charged polymer chains are able to collapse back, in part, toward the pore wall. This increases the effective diameter of the pores, which results in higher permeabilities.

Molecular Weight Cutoff

Figure 12:
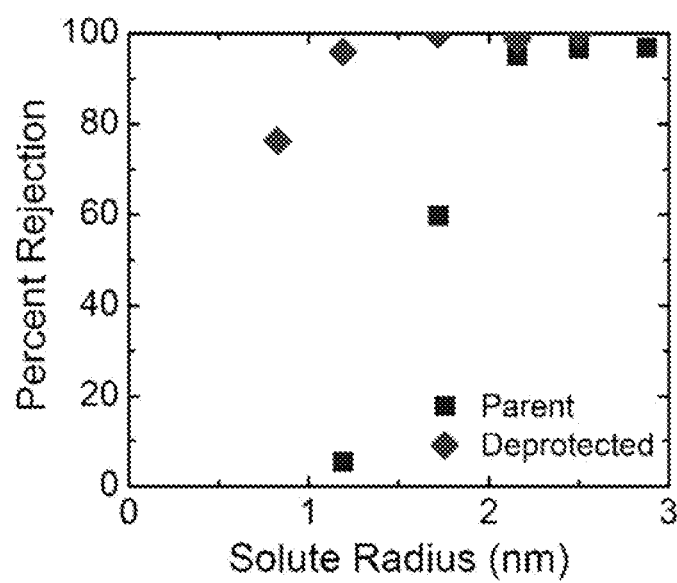
FIG. 12. Molecular weight cut-off (MWCO) curves for the parent and deprotected (i.e., PAA-functionalized) membranes were generated using solutions that contained polyethylene oxide (PEO) molecules as model solutes of known size. PEO molecular weights of 1.1, 2.1, 4.0, 6.0, 7.8, and 10.0 kDa were used. The percent rejection was determined by taking the ratio of the PEO concentration in the permeate to the 1 g L$^{-1}$ feed.
Figure 13:
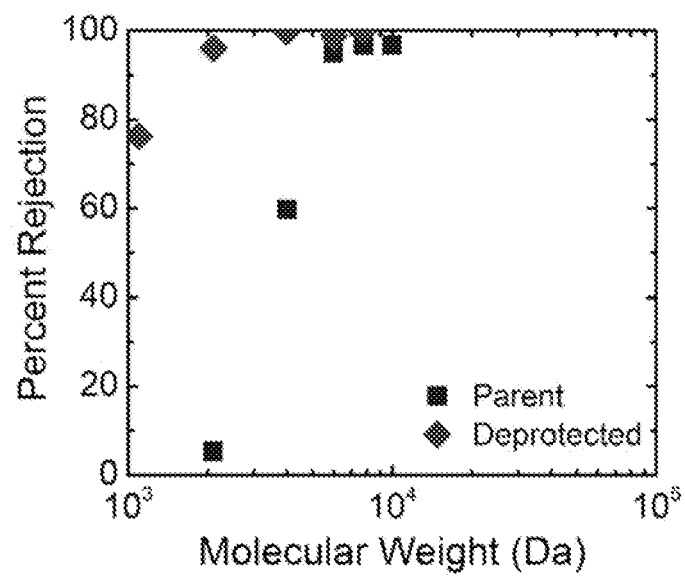
FIG. 13. Molecular weight cut-off (MWCO) curves for the parent and deprotected membranes shown in FIG. 16 plotted here against molecular weight of solute molecules. The solutions contained polyethylene oxide (PEO) molecules of 1.1, 2.1, 4.0, 6.0, 7.8, and 10.0 kDa molecular weights. The percent rejection was determined by taking the ratio of the PEO concentration in the permeate to the 1 g L⁻¹ feed.

A molecular weight cutoff experiment after conversion of PDMA to PAA was performed and resulted in the curve shown by the diamonds shown in FIG. 12. This experiment was performed in deionized water (pH=5.5) where the PAA chains that line the pore walls are expected to extend into the pores, constricting flow. The curve shows nearly complete rejection for solutes with characteristic radii above 1.25 nm, and moderate rejection (~76%) for solutes that are 0.8 nm in radius. This curve has shifted to the left of the parent curve, again suggesting that the pore size of the PAA-lined membrane is smaller than the parent membrane.

Based on the theory for size-selective transport, the pore diameter of the converted membrane is calculated to be 2.6 nm in diameter, compared to 8.1 nm for the parent membrane. This PI-PS-PAA membrane retains its high selectivity after deprotection and is able to perform size-selective separations for solutions containing particles with hydrodynamic radii of ~1 nm. This is in the extreme lower limit of pore sizes for membranes based on block polymers; in fact, it is the smallest diameter reported for nanoporous films originating from block polymer templates. As such, this membrane architecture presents a new paradigm in block polymer based separations. Furthermore, the ability of tunable pore functionality makes this carboxylic acid-functionalized membrane analog a highly versatile and powerful platform for nanoscale separations.

These results demonstrate the ability to use a PI-PS-PDMA triblock terpolymer, synthesized via the easily-controlled RAFT polymerization mechanism, as a templating agent for the nanostructure of asymmetric, porous membranes that are produced using the SNIPS technique. Furthermore, the PDMA block that lines the pore walls of the membrane can be converted cleanly by simply soaking the membrane in an HCl solution to yield PAA-lined pores. This enables the pore functionality to be chemically-tailored without degradation of the membrane nanostructure. Additionally, the high densities of well-defined pores in these membranes are capable of producing size selective separations for solutes as small as 8 nm in the as-synthesized PI-PS-PDMA state and 2 nm in diameter after conversion to the PI-PS-PAA state. The unique combination of properties provided by the PI-PS-PDMA material enables next-generation membranes that meet the process demands of multiple high value separations (e.g., water purification, biopharmaceuticals separations) to be designed and produced in a simple and facile manner.

Example 9. Mechanical Testing of Membrane Films

Dynamic mechanical analysis (DMA) experiments of the membrane films were performed in tensile loading mode using a TA Instruments DMA Q800. For the wetted film experiments, a length of film (~25 mm by 10 mm) was clamped between the two tensile contacts. Wetted film experiments were performed using a humidification chamber attachment at 35° C. at a relative humidity of 95% and at a stress rate of 0.5 N min-1.

Figure 18:
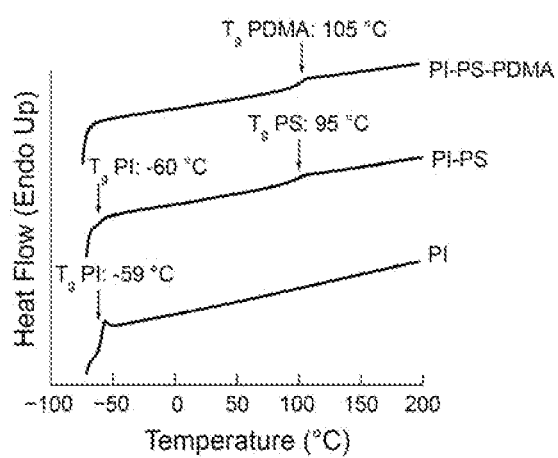
FIG. 18. The second heating scan of differential scanning calorimetry (DSC) traces of the PI and PI-PS precursor samples and the PI-PS-PDMA triblock terpolymer. The glass transition temperature ($T_g$) values for each domain in these samples corresponds well with the glass transition temperature values measured for equivalently-sized homopolymer analogs. Discrete glass transition temperatures in the triblock terpolymers were not observed readily due to the close proximity of the glass transition temperatures of PS and PDMA.

The second heating scan of DSC traces of the PI and PI-PS precursor samples and the PI-PS-PDMA triblock terpolymer is shown in FIG. 18. The glass transition temperature (Tg) values for each domain in these samples corresponds well with the glass transition temperature values measured for equivalently-sized homopolymer analogs.

Example 10. Partial Rejection Study

We have demonstrated the ability to separate molecules based on differences in solute size using a standard stirred cell system. After placing the membrane in the system, the membrane was challenged with solutions containing polyethylene oxide (PEO) molecules ranging in molecular weight from 1.1 to 10 kDa. If necessary, larger molecular weights can be used to characterize pores with larger dimensions. The hydrodynamic radii of the PEO molecules were calculated using intrinsic viscosity and diffusion coefficients data. The hydrodynamic radii ranged from 0.75 to 3.0 nm. Percent rejection values were calculated by comparing the concentration of PEO in the solution that permeated the membrane to the concentration of PEO in the initial feed solution. The concentration of PEO was determined using total organic carbon analysis.

For the PI-PS-PDMA membrane, solutes with a hydrodynamic radius greater than 2.2 nm, (i.e., a 6.0 kDa PEO molecule) were almost completely rejected. Molecules with hydrodynamic radii smaller than 1.2 nm (i.e., a 2.1 kDa PEO sample) permeate through the membrane with little (~4%) rejection. A 4.0 kDa PEO sample, which has a hydrodynamic radius equal to 1.7 nm, was only partially rejected (60% rejection). This point of datum, in conjunction with established theories for size-selective separations, was used to estimate the pore size of the parent membrane at 8.1 nm in diameter.

A molecular weight cutoff experiment after conversion of PDMA to PAA was performed. This experiment was performed in deionized water (pH=5.5) where the PAA chains that line the pore walls are expected to extend into the pores, constricting flow. The curve shows nearly complete rejection for the 2.1 kDa PEO sample (characteristic radii of 1.2 nm), and moderate rejection (~76%) for the 1.1 kDa PEO sample (0.8 nm in radius). Based on the theory for size-selective transport, the pore diameter of the converted membrane is calculated to be 2.6 nm in diameter, compared to 8.1 nm for the parent membrane. This PI-PS-PAA membrane retains its high selectivity after conversion of PDMA to PAA and is able to perform size-selective separations for solutions containing particles with hydrodynamic radii of ~1 nm.

The PI-PS-PAA functionalized membrane was also challenged with an aqueous solution containing $Mg^{+2}$ and $SO_4^{-2}$ ions, which have a hydration diameter of 0.8 nm and 0.4 nm, respectively. The percent rejection of these ionic species was 55%. Percent rejection values were calculated by comparing the concentration of $Mg^{+2}$ and $SO_4^{-2}$ in the solution that permeated the membrane to the concentration of $Mg^{+2}$ and $SO_4^{-2}$ in the initial feed solution. The concentration of $Mg^{+2}$ and $SO_4^{-2}$ were determined using ion chromatography.

Using a PI-PS-PDMA membrane with a lower total molecular weight of about 30 kDa, and a weight fraction for the three blocks of approximately 25%, 50% and 25%, respectively, we were able to obtain smaller pore sizes of less than 1 nm in diameter.

During these experiments, the feed solutions were stirred at 400 rpm to produce mass transfer coefficients, k, on the order of $1.0 \times 10^{-5}$ m s$^{-1}$,[4] while the water flux, $J_w$, during the MWCO tests was kept near of below this value. This results in a $J_w/k$ value around 0.13 to 1, which is significantly lower than the suggested limit where concentration polarization becomes severe, ensuring the results are solely a function of the ability of the membrane to separate solutes based on size.

Example 11. Functionalization of Membranes

We have demonstrated the ability to convert the carboxylic acid functionality of the PAA moiety to that of an alcohol, a cysteamine, an alkyl chain, and a sulfonic acid functionality through simple coupling reactions. In particular, a small molecule of structure $NH_2$—R (where R is the specific chemical functionality described above). This broad platform, which can be used either as a solid state or liquid reaction, is amenable to any other R functionality due to the robustness and high driving force associated with the condensation reaction between an amine and a carboxylic acid.

Definitions

The following definitions are included to provide a clear and consistent understanding of the specification and claims. As used herein, the recited terms have the following meanings. All other terms and phrases used in this specification have their ordinary meanings as one of skill in the art would understand.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrase "one or more" is readily understood by one of skill in the art, particularly when read in context of its usage.

The term "about" can refer to a variation of ±10% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values (e.g., weight percentages), proximate to the recited range that are equivalent in terms of the functionality of the individual ingredient, the composition, or the embodiment). The term about can also modify the end-points of a recited range as discuss above in this paragraph.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percentages) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited or desired effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "nanostructured" means any structural feature measured on a nanoscale. For example, the pore size of the membranes of the present invention are measured in nanometers or fractions thereof. Hence, the membranes of the present invention are nanostructured in this respect.

The term "microporous" refers to the porosity of the support layer of the membranes or films of the present invention.

The term "nanoporous" refers to the porosity of the surface active layer of the membranes or films of the present invention, which have pores sizes that are characteristically less than 100 nm, or less than 10 nm or less than 5 nm. In some embodiments they are less than one nanometer.

The terms "ultrafiltration" refers to filtration using a medium fine enough to retain colloidal particles, viruses, or large molecules. Nanofiltration refers to membrane filtration based method that uses nanometer sized cylindrical throughpores that pass through the membrane at a 90°. Nanofiltration membranes have pore sizes from 1-10 nanometers, smaller than that used in microfiltration and ultrafiltration, but just larger than that in reverse osmosis.

The term "selectivity" refers to a measure of how well a membrane can distinguish between two different types of matter, such as the capability to selectively allow passage through the membrane of one or more types of matter while selectively disallowing passage of different one or more types of matter from passing through the membrane.

The term "selective layer" or "active selective layer" refers to the upper layer of the membranes or films of the present invention, which have a nanoporous structure and give the membrane its selectivity.

The term "gutter (or porous) layer" refers to the microporous support layer formed beneath the nanoporous active selective layer according to the methods described herein. In contrast to the selective layer, the gutter layer does affect the selectivity of the membrane. Its main function is typically to add support and/or stability to the membrane structure.

EQUIVALENTS AND SCOPE

Specific ingredients and proportions are for illustrative purposes. Ingredients may be exchanged for suitable equivalents and proportions may be varied, according to the desired properties of the dosage form of interest.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A multiblock copolymer membrane comprising a self-assembled nanoporous active selective layer comprising pores characterized by an average pore diameter of less than 5 nm, wherein the multiblock copolymer is a block terpolymer selected from the group consisting of polyisoprene-b-polystyrene-b-poly(N,N-dimethylacrylamide) [PI-PS-PDMA], polyisoprene-b-polystyrene-b-poly(tert-butylmethacrylate) [PI-PS-PtBMA], poly(isoprene)-b-polystyrene)-b-poly((4-vinyl)pyridine), poly(isoprene)-b-poly(styrene)-b-poly((2-vinyl) pyridine), poly(isoprene)-b-poly(styrene)-b-poly(ethylene oxide), poly(isoprene)-b-poly(styrene b-poly(methyl methacrylate), poly(isoprene)-b-poly(styrene)-b-poly(acrylic acid), poly(isoprene)-b-poly(styrene)-b-poly(dimethylethyl amino ethyl methacrylate), poly(isoprene)-b-poly(styrene)-b-poly(hydroxystyrene), poly(isoprene-b-poly($\alpha$-methyl styrene)-b-poly((4-vinyl) pyridine), poly(isoprene)-b-poly($\alpha$-methyl styrene)-b-poly((2-vinyl) pyridine), poly(isoprene)-b-poly($\alpha$-methyl styrene)-b-poly(ethylene oxide), poly(isoprene)-b-poly($\alpha$-methyl styrene)-b-poly(methyl methacrylate), poly(isoprene)-b-poly($\alpha$-methyl styrene)-b-poly(acrylic acid), poly(isoprene)-b-poly($\alpha$-methyl styrene)-b-poly(dimethylethyl amino ethyl methacrylate), poly (butadiene)-b-poly(styrene)-b-poly((4-vinyl)pyridine), poly(butadiene)-b-poly(styrene)-b-poly((2-vinyl) pyridine), poly(butadiene)-b-poly(styrene)-b-poly(ethylene oxide), poly(butadiene)-b-poly(styrene)-b-poly(methyl methacrylate), poly(butadiene)-b-poly(styrene)-b-poly(acrylic acid), poly(butadiene)-b-poly(styrene)-b-poly(dimethylethyl amino ethyl methacrylate), poly(butadiene)-b-poly(styrene)-b-poly(hydroxystyrene), poly(butadiene)-b-poly($\alpha$-methyl styrene)-b-poly((4-vinyl) pyridine), poly(butadiene)-b-poly($\alpha$-methyl styrene)-b-poly((2-vinyl) pyridine), poly(butadiene)-b-poly($\alpha$-methyl styrene)-b-poly(ethylene oxide), poly(butadiene)-b-poly($\alpha$-methyl styrene)-b-poly(methyl methacrylate), poly (butadiene)-b-poly($\alpha$-methyl styrene)-b-poly(acrylic acid), and poly(butadiene)-b-poly($\alpha$-methyl styrene)-b-poly(dimethylethyl amino ethyl methacrylate).

2. The multiblock copolymer membrane of claim 1, wherein the average pore diameter of the nanoporous active selective layer is less than 1 nm.

3. The multiblock copolymer membrane of claim 1, wherein the multiblock copolymer is selected from the group consisting of polyisoprene-b-polystyrene-b-poly(N, N-dimethylacrylamide) [PI-PS-PDMA], polyisoprene-b-polystyrene-b-poly(tert-butylmethacrylate) [PI-PS-PtBMA], poly(isoprene)-b-poly(styrene)-b-poly((4-vinyl) pyridine), poly(isoprene)-b-poly(styrene)-b-poly((2-vinyl) pyridine), poly(isoprene)-b-poly(styrene)-b-poly(acrylic acid), poly(isoprene)-b-poly(styrene)-b-poly(dimethylethyl amino ethyl methacrylate), poly(isoprene)-b-poly(styrene)-b-poly(hydroxystyrene), poly(isoprene)-b-poly($\alpha$-methyl styrene)-b-poly(acrylic acid), poly(butadiene)-b-poly(styrene)-b-poly((4-vinyl)pyridine), poly(butadiene)-b-poly(styrene)-b-poly((2-vinyl) pyridine), poly(butadiene)-b-poly(styrene)-b-poly(ethylene oxide), poly(butadiene)-b-poly(styrene)-b-poly(methyl methacrylate), poly(butadiene)-b-poly(styrene)-b-poly(acrylic acid), poly(butadiene)-b-poly(styrene)-b-poly(dimethylethyl amino ethyl methacrylate), poly(butadiene)-b-poly(styrene)-b-poly(hydroxystyrene) and poly(butadiene)-b-poly($\alpha$-methyl styrene)-b-poly(acrylic acid).

4. A multiblock copolymer membrane comprising a self-assembled nanoporous active selective layer comprising pores characterized by an average pore diameter of less than 5 nm, wherein the multiblock terpolymer is a block terpolymer selected from the group consisting of PI-PS-PDMA and PI-PS-PtBMA.

5. A device comprising the multiblock copolymer membrane of claim 1.

6. The multiblock copolymer membrane of claim 1, wherein the membrane has been chemically functionalized with a moiety selected from the group consisting of an alcohol, hydroxyl, carbonyl, aldehyde, thiol, ketone, acyl halide, carbonate, carboxylate, carboxylic acid, ester, methoxy, hydroperoxide, peroxide, ether, hemiacetal, hemiketal, acetal, ketal, acetal, orthoester, heterocycle, orthocarbonate ester, amide, amine, imine, imide, azide, cyanate, nitrate, nitrile, nitrite, nitro compound, nitroso compound, pyridine, pyridine derivative, thiol, sulfide, thioether, disulfide, sulfoxide, sulfone, sulfinic acid, sulfonic acid, thiocyanate, thione, thiol, phosphine, phosphane, phosphonic acid, phosphate, phosphodiester, boronic acid, boronic ester, bonnie acid, borinic ester, carboxylic acid, alkyl group, and any combination thereof.

7. A method for separating, purifying, filtering or concentrating a liquid solution, comprising contacting the membrane of claim 1 with the liquid solution.

8. The multiblock copolymer membrane of claim 1, wherein the membrane is an organic membrane comprising a nanoporous active selective layer, wherein the nanoporous active selective layer comprises a plurality of pores, the pores characterized by:
 (i) substantially uniform pore diameters of less than 5 nm; and
 (ii) substantially uniform pore orientations which are approximately perpendicular to surfaces of the membrane.

9. The organic membrane of claim 8, wherein the pores are characterized by substantially uniform pore diameters of less than 1 nm.

10. A device comprising the organic membrane of claim 8.

11. A method for separating, purifying, filtering or concentrating a liquid solution, comprising contacting the organic membrane of claim 8 with the liquid solution.

12. A method for forming the multiblock copolymer membrane of claim 1, the method comprising the steps of:
 a) synthesizing a self-assembled A-B-C multiblock copolymer; and
 b) fabricating a nanostructured membrane from the self-assembled A-B-C multiblock copolymer using a self-assembly and non-solvent induced phase separation.

13. The method of claim 12, wherein the synthesizing the self-assembled A-B-C multiblock copolymer is carried out through a controlled reversible addition-fragmentation chain transfer polymerization mechanism.

14. The method of claim 12, wherein the nanostructured membrane is characterized by an average pore diameter of about 0.5-3 nm.

15. A nanostructured membrane of a self-assembled A-B-C multiblock copolymer, wherein the copolymer comprises a terpolymer, and the terpolymer comprises polyisoprene-b-polystyrene-b-poly(N,N-dimethylacrylamide) [PI-PS-PDMA] or polyisoprene-b-polystyrene-b-poly(tert-butylmethacrylate) [PI-PS-PtBMA].

16. A nanostructured membrane of a self-assembled A-B-C multiblock copolymer, wherein the copolymer comprises a terpolymer, and the terpolymer comprises polyisoprene-b-polystyrene-b-poly(N,N-dimethylacrylamide) [PI-PS-PDMA], polyisoprene-b-polystyrene-b-poly(tert-butylmethacrylate) [PI-PS-PtBMA], poly(isoprene)-b-poly((4-vinyl)pyridine), poly(isoprene)-b-poly(styrene)-b-poly((2-vinyl) pyridine), poly(isoprene)-b-poly(styrene)-b-poly(ethylene oxide), poly(isoprene)-b-poly(styrene)-b-poly(methyl methacrylate), poly(isoprene)-b-poly(styrene)-b-poly(acrylic acid), poly(isoprene)-b-poly(styrene)-b-poly(dimethylethyl amino ethyl methacrylate), poly(isoprene)-b-poly(styrene)-b-poly(hydroxystyrene), poly(isoprene)-b-poly($\alpha$-methyl styrene)-b-poly((4-vinyl) pyridine), poly(isoprene)-b-poly($\alpha$-methyl styrene)-b-poly((2-vinyl) pyridine), poly(isoprene)-b-poly($\alpha$-methyl styrene)-b-poly(ethylene oxide), poly(isoprene)-b-poly($\alpha$-methyl styrene)-b-poly(methyl methacrylate), poly(isoprene)-b-poly($\alpha$-methyl styrene)-b-poly(acrylic acid), poly(isoprene)-b-poly($\alpha$-methyl styrene)-b-poly(dimethylethyl amino ethyl methacrylate), poly (butadiene)-b-poly(styrene)-b-poly((4-vinyl)pyridine), poly(butadiene)-b-poly(styrene)-b-poly((2-vinyl) pyridine), poly(butadiene)-b-poly(styrene)-b-poly(ethylene oxide), poly(butadiene)-b-poly(styrene)-b-poly(methyl methacrylate), poly(butadiene)-b-poly(styrene)-b-poly(acrylic acid), poly(butadiene)-b-poly(styrene)-b-poly(dimethylethyl amino ethyl methacrylate), poly(butadiene)-b-poly(styrene)-b-poly(hydroxystyrene), poly(butadiene)-b-poly($\alpha$-methyl styrene)-b-poly((4-vinyl) pyridine), poly(butadiene)-b-poly($\alpha$-methyl styrene)-b-poly((2-vinyl) pyridine), poly(butadiene)-b-poly($\alpha$-methyl styrene)-b-poly(ethylene oxide), poly(butadiene)-b-poly($\alpha$-methyl styrene)-b-poly(methyl methacrylate), poly (butadiene)-b-poly($\alpha$-methyl styrene)-b-poly(acrylic acid), or poly(butadiene)-b-poly($\alpha$-methyl styrene)-b-poly(dimethylethyl amino ethyl methacrylate).

17. The nanostructured membrane of claim 16, wherein the terpolymer comprises polyisoprene-b-polystyrene-b-poly(N,N-di methyl acrylamide) [PI-PS-PDMA], polyisoprene-b-polystyrene-b-poly(tert-butylmethacrylate) [PI-PS-PtBMA], poly(isoprene)-b-poly(styrene)-b-poly((4-vinyl) pyridine), poly(isoprene)-b-poly(styrene)-b-poly((2-vinyl) pyridine), poly(isoprene)-b-poly(styrene)-b-poly(acrylic acid), poly(isoprene)-b-poly(styrene)-b-poly(dimethylethyl amino ethyl methacrylate), poly(isoprene)-b-poly(styrene)-b-poly(hydroxystyrene), poly(isoprene)-b-poly($\alpha$-methyl styrene)-b-poly(acrylic acid), poly(butadiene)-b-poly(styrene)-b-poly((4-vinyl)pyridine), poly(butadiene)-b-poly(styrene)-b-poly((2-vinyl) pyridine), poly(butadiene)-b-poly(styrene)-b-poly(ethylene oxide), poly(butadiene)-b-poly(styrene)-b-poly(methyl methacrylate), poly(butadiene)-b-poly(styrene)-b-poly(acrylic acid), poly(butadiene)-b-poly(styrene)-b-poly(dimethylethyl amino ethyl methacrylate), poly(butadiene)-b-poly(styrene)-b-poly(hydroxystyrene), or poly(butadiene)-b-poly($\alpha$-methyl styrene)-b-poly(acrylic acid).

18. The method of claim 12 wherein the multiblock copolymer comprises a terpolymer that comprises polyisoprene-b-polystyrene-b-poly(N,N-dimethylacrylamide) [PI-PS-PDMA] or polyisoprene-b-polystyrene-b-poly(tert-butylmethacrylate) [PI-PS-PtBMA].

* * * * *

UNITED STATES PATENT AND TRADEMARK OFFICE
CERTIFICATE OF CORRECTION

PATENT NO. : 10,022,679 B2
APPLICATION NO. : 14/774936
DATED : July 17, 2018
INVENTOR(S) : William A. Phillip Page 1 of 1

It is certified that error appears in the above-identified patent and that said Letters Patent is hereby corrected as shown below:

In the Claims

Claim 1, Column 38, Line 7, delete "*polystyrene-b-poly((4-vinyl)pyridine),*" and insert -- *poly(styrene)-b-poly((4-vinyl)pyridine),* -- therefor;

Claim 1, Column 38, Line 35, delete "*(dim-*" and insert -- *(di-* -- therefor;

Claim 1, Column 38, Line 36, delete "*ethylethyl*" and insert -- *methylethyl* -- therefor;

Claim 6, Column 39, Line 14, delete "*thiol*" and insert -- *thial* -- therefor;

Claim 16, Column 40, Line 33, delete "*(dim-*" and insert -- *(di-* -- therefor;

Claim 16, Column 40, Line 34, delete "*ethylethyl*" and insert -- *methylethyl* -- therefor;

Claim 17, Column 40, Line 37, delete "*(N,N-di methyl acrylamide)*" and insert -- *(N,N-dimethyl acrylamide)* -- therefor.

Signed and Sealed this
Twenty-first Day of August, 2018

Andrei Iancu
*Director of the United States Patent and Trademark Office*